(12) United States Patent (10) Patent No.: US 8,078,560 B2
Takata et al. (45) Date of Patent: Dec. 13, 2011

(54) OPERATION CHECK INFORMATION PROVIDING DEVICE AND ELECTRONIC DEVICE USING THE SAME

(75) Inventors: Kazutoyo Takata, Osaka (JP); Koji Morikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 586 days.

(21) Appl. No.: 12/304,217

(22) PCT Filed: Mar. 20, 2007

(86) PCT No.: PCT/JP2007/055737
§ 371 (c)(1),
(2), (4) Date: Dec. 10, 2008

(87) PCT Pub. No.: WO2007/145007
PCT Pub. Date: Dec. 21, 2007

(65) Prior Publication Data
US 2009/0327816 A1 Dec. 31, 2009

(30) Foreign Application Priority Data
Jun. 13, 2006 (JP) ................................. 2006-163692

(51) Int. Cl.
*G06N 5/00* (2006.01)
(52) U.S. Cl. ......................................................... 706/45
(58) Field of Classification Search ...................... 706/45
See application file for complete search history.

(56) References Cited

U.S. PATENT DOCUMENTS
2007/0011195 A1 1/2007 Kutsumi et al.

FOREIGN PATENT DOCUMENTS
JP 03-248199 11/1991
(Continued)

OTHER PUBLICATIONS
Ramkishor, et al, Error Resilience Algorithms for MPEG-4 Video over Wireless Channels, 2002, pp. 1-4.*
(Continued)

*Primary Examiner* — Wilbert L Starks
(74) *Attorney, Agent, or Firm* — Renner, Otto, Boisselle & Sklar, LLP

(57) ABSTRACT

An apparatus is provided for, when the user makes an input manipulation, estimating a manipulation for which the user is likely to make an error, in accordance with the knowledge of the user, and providing a manipulation support such as, for example, automatically displaying a confirmation request for the manipulation for which the probability of the input being an error is high.

A device (100) usable for an electronic apparatus (1) operating based on a manipulation of the user includes an input section (101) for receiving a manipulation of the user, a storage section (104) having a database including a plurality of manipulation error patterns stored therein, a determination section (107) for determining whether or not a manipulation confirmation request is necessary based on the manipulation error pattern corresponding to the user, which is determined by referring to the database based on manipulation information which indicates the received manipulation and correction information which indicates whether or not the manipulation needs to be corrected, and an output section (108) for outputting a signal for presenting a manipulation confirmation request message when the confirmation request is to be provided. Each manipulation error pattern is information on a manipulation error on each of functions of a manipulation target apparatus, the information being defined based on a manipulation experience of a plurality of users each having the manipulation experience with an apparatus other than the electronic apparatus (1) which is the manipulation target apparatus.

21 Claims, 19 Drawing Sheets

FOREIGN PATENT DOCUMENTS

| | | |
|---|---|---|
| JP | 08-249153 | 9/1996 |
| JP | 2000-163186 | 6/2000 |
| JP | 2001-290531 | 10/2001 |
| JP | 2004-038867 | 2/2004 |
| JP | 2004-253004 | 9/2004 |
| JP | 2005-259160 | 9/2005 |
| WO | 2006/051709 | 5/2006 |

OTHER PUBLICATIONS

International Search Report for corresponding Application No. PCT/JP2007/055737 mailed Jun. 19, 2007.
Form PCT/ISA/237 and a partial English translation.

* cited by examiner

DEVICE MANIPULATION DATABASE 39

| FUNCTION | CORRECT MANIPULA-TION | MANIPULA-TION ERROR GROUP A | MANIPULA-TION ERROR GROUP B | MANIPULA-TION ERROR GROUP C | MANIPULA-TION ERROR GROUP D |
|---|---|---|---|---|---|
| PROGRAM TABLE | PROGRAM TABLE | PROGRAM TABLE | PROGRAM TABLE | LIST | LIST |
| RECORDED PROGRAM LIST | LIST | LIST | MENU | LIST | MENU |
| ... | ... | ... | ... | ... | ... |
| RECORD | RECORD | RECORD | RECORD | RECORD | RECORD |

MANIPULATION ERROR PATTERN 40

(b)

DEVICE MANIPULATION DATABASE 39

| FUNCTION | CORRECT MANIPULA-TION | MANIPULA-TION ERROR GROUP A | MANIPULA-TION ERROR GROUP B | MANIPULA-TION ERROR GROUP C | MANIPULA-TION ERROR GROUP D |
|---|---|---|---|---|---|
| FUNCTION 1 | B1 | B1 | B1 | B2 | B2 |
| ... | ... | ... | ... | ... | ... |
| FUNCTION k | Bk | Bk | Bj | Bk | Bj |
| ... | ... | ... | ... | ... | ... |
| FUNCTION n | Bn | Bn | Bn | Bn | Bn |

MANIPULATION ERROR PATTERN 40

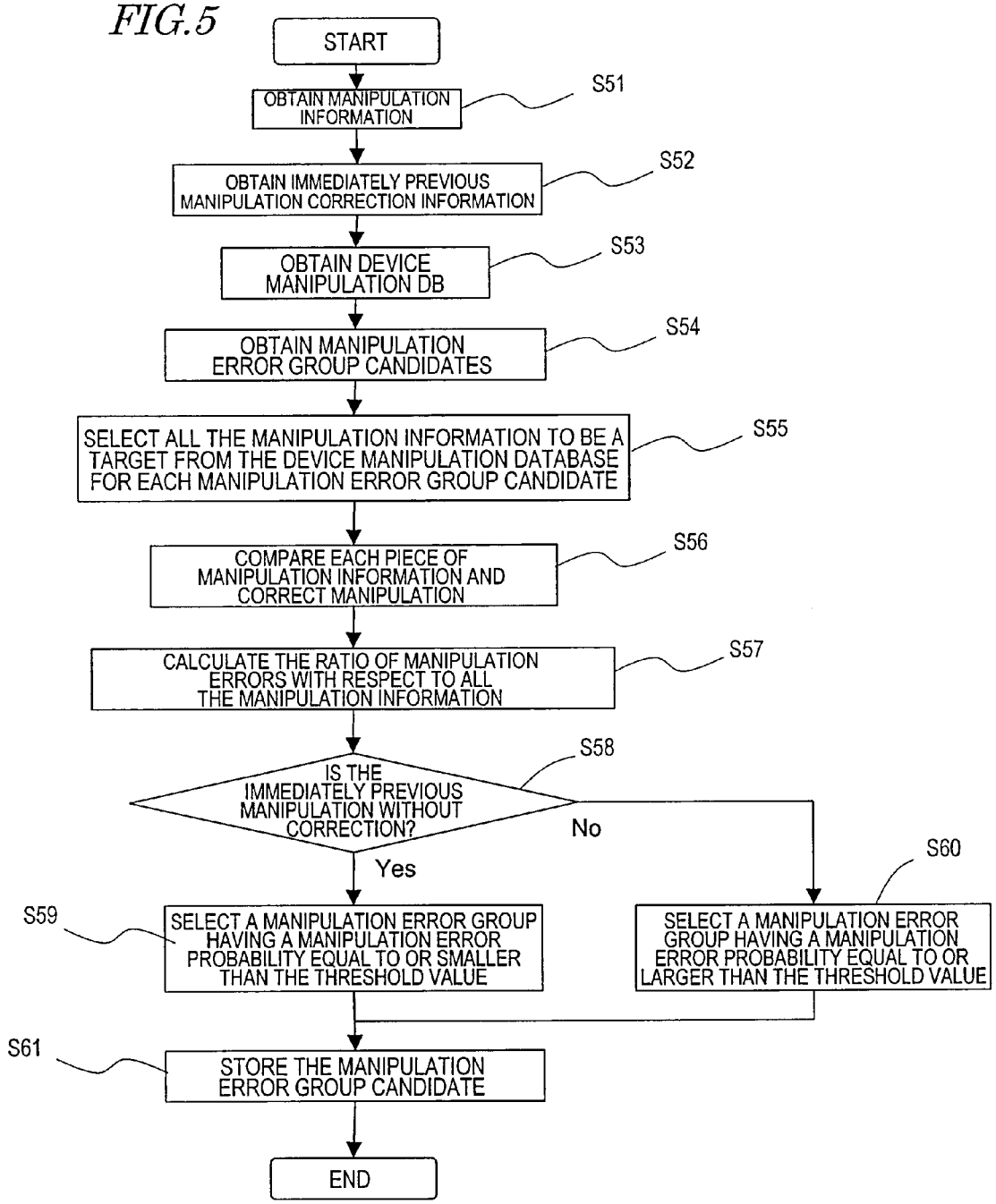

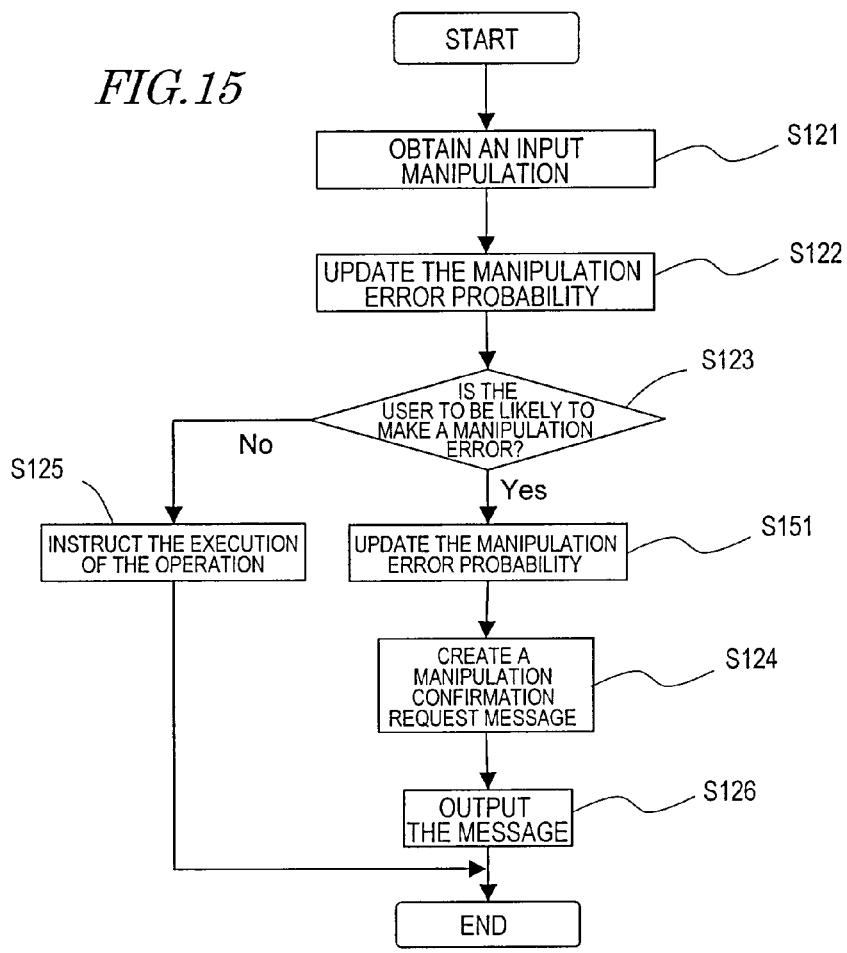

FIG.19

| | | panasonic EH60 | |
|---|---|---|---|
| | QUESTION | STATE BEFORE MANIPULATION | CORRECT MANIPULATION |
| Q1. | POWER ON TV. | TV SCREEN:off<br>DVD MACHINE:off | TV POWER |
| Q2. | SWITCH TV INPUT TO VIDEO 1. | TV SCREEN:on<br>DVD MACHINE:off | TV INPUT |
| Q3. | POWER ON DVD RECORDER. | TV SCREEN:VIDEO 1 SCREEN<br>DVD MACHINE:HDD MODE | DVD POWER |
| Q4. | DISPLAY CHANNEL 8. | TV SCREEN:VIDEO 1 SCREEN<br>DVD MACHINE:HDD MODE | 8 |
| Q5. | WORLD HERITAGE DVD-ROM IS ALREADY IN. PLAY THIS DVD-ROM. | TV SCREEN:8ch<br>DVD MACHINE: HDD MODE | DVD ⇒PLAY |
| Q6. | STOP. | TV SCREEN:WORLD HERITAGE BEING PLAYED<br>DVD MACHINE:PLAYBACK DISPLAY | STOP |
| Q7. | DISPLAY CHANNEL 6. | TV SCREEN:DVD BACKGROUND<br>DVD MACHINE:DVD MODE | HDD ⇒6 |
| Q8. | RECORD CURRENTLY DISPLAYED PROGRAM ON HDD (HARD DISK). | TV SCREEN:6ch<br>DVD MACHINE: HDD MODE | RECORD |
| Q9. | STOP RECORDING. | TV SCREEN:6ch<br>DVD MACHINE: RECORD LAMP ON | STOP |
| Q10. | DISPLAY THE LIST OF PROGRAMS RECORDED ON HDD (HARD DISK). | TV SCREEN:6ch<br>DVD MACHINE: HDD MODE | PROGRAM NAVIGATION |
| Q11. | SELECT BASEBALL FROM THE PROGRAM LIST. | TV SCREEN:PROGRAM NAVIGATION<br>DVD MACHINE: HDD MODE | CURSOR OR JOG DIAL⇒SELECT BASEBALL |
| Q12. | PLAY THE SELECTED BASEBALL PROGRAM. | TV SCREEN:PROGRAM NAVIGATION<br>DVD MACHINE: HDD MODE | PLAY OR ENTER |
| Q13. | PLAY THE NEXT CHAPTER. | TV SCREEN:PLAYBACK SCREEN<br>DVD MACHINE: HDD MODE | SKIP |
| Q14. | STOP. | TV SCREEN:PLAYBACK SCREEN<br>DVD MACHINE: HDD MODE | STOP |
| Q15. | SELECT VOLLEYBALL FROM THE PROGRAM LIST. | TV SCREEN:PROGRAM NAVIGATION<br>DVD MACHINE: HDD MODE | CURSOR OR JOG DIAL ⇒SELECT VOLLEYBALL |
| Q16. | THE SELECTED VOLLEYBALL PROGRAM IS TO BE ERASED. DISPLAY ERASE SCREEN. | TV SCREEN:PLAYBACK SCREEN<br>DVD MACHINE: HDD MODE | SUBMENU ⇒ERASE TITLE ⇒ENTER |
| Q17. | CANCEL THE PROGRAM ERASE. | TV SCREEN:ERASE SCREEN<br>DVD MACHINE: HDD MODE | SELECT CANCEL ⇒ENTER |
| Q18. | RETURN TO THE TV SCREEN. | TV SCREEN:PROGRAM NAVIGATION<br>DVD MACHINE: HDD MODE | PLAY NAVIGATION OR RETURN |
| Q19. | DISPLAY THE PROGRAM TABLE. | TV SCREEN:6ch<br>DVD MACHINE: HDD MODE | PROGRAM TABLE |
| Q20. | MAKE A RECORDING RESERVATION OF THE CURRENTLY SELECTED PROGRAM. | TV SCREEN:PROGRAM TABLE<br>DVD MACHINE: HDD MODE | ENTER |

FIG.21

EH60 MANIPULATION RESULTS

MANIPULATION INFORMATION 21

| DISPLAY RECORDED PROGRAM LIST | FUNCTION 23 | CORRECT MANIPULATION 22 | CORRECT ANSWER RATIO 20 | | | | WITHOUT LEARNING | E95H | | | PSX | | | XS43 | | | | WITHOUT LEARNING | | |
|---|---|---|---|---|---|---|---|---|---|---|---|---|---|---|---|---|---|---|---|---|
| QUES-TION | FUNCTION | CORRECT MANIPULATION | E95H | PSX | XS43 | WITHOUT LEARNING | | P1 | P2 | P3 | P4 | P5 | P6 | P7 | P8 | P9 | P10 | P11 |
| Q1 | POWER ON TV | TV POWER | 1.0 | 1.0 | 1.0 | 1.0 | | | | | | | | | | | | |
| Q2 | SWITCH TV INPUT | TV INPUT | 1.0 | 1.0 | 1.0 | 0.7 | | | | | | | | | | | HDD | |
| Q3 | POWER ON DVD | DVD POWER | 1.0 | 1.0 | 1.0 | 1.0 | | | | | | | | | | | | |
| Q4 | SWITCH TO 8ch | 8 | 1.0 | 1.0 | 1.0 | 1.0 | | | | | | | | | | | | |
| Q5 | SWITCH TO DVD | DVD | 1.0 | 1.0 | 1.0 | 0.7 | | | | | | | | | | | PLAY | |
| Q6 | STOP | STOP | 1.0 | 1.0 | 1.0 | 1.0 | | | | | | | | | | | | |
| Q7 | SWITCH TO DVD | HDD | 1.0 | 0.0 | 0.0 | 0.0 | | | | | 6 | 6 | 6 | 6 | 6 | 6 | 6 | 6 |
| Q8 | RECORD | RECORD | 1.0 | 1.0 | 0.7 | 1.0 | | | | | | | HDD | | | | | |
| Q9 | STOP | STOP | 1.0 | 1.0 | 1.0 | 1.0 | | | | HDD | HDD | HDD | | | | | | |
| Q10 | PROGRAM NAVIGATION | 1.0 | 0.0 | 0.0 | 0.7 | | | | | | | PROGRAM TABLE | PROGRAM TABLE | PROGRAM TABLE | PROGRAM TABLE | | |
| Q11 | SELECT | CURSOR/JOG DIAL | 1.0 | 0.7 | 0.7 | 1.0 | | | | | | | | SELECT FUNCTION | | RIGHTWARD CURSOR | | |
| Q12 | PLAY | PLAY/ENTER | 1.0 | 1.0 | 1.0 | 1.0 | | | | | | | | | | | | |
| Q13 | SKIP | SKIP | 1.0 | 0.5 | 0.7 | 0.7 | | | | | | | | | | | | |
| Q14 | STOP | STOP | 1.0 | 1.0 | 1.0 | 1.0 | | | | | | | | | | | | |
| Q15 | SELECT | CURSOR/JOG DIAL | 1.0 | 1.0 | 1.0 | 1.0 | | | | | | | SELECT FUNCTION | SELECT FUNCTION | SELECT FUNCTION | | | |
| Q16 | ERASE PROGRAM | SUBMENU/ERASE | 1.0 | 1.0 | 0.7 | 1.0 | | | | | | | | | | | | |
| Q17 | SELECT | ENTER | 1.0 | 1.0 | 1.0 | 0.7 | | | | | 1 | | | | PROGRAM TABLE | TV POWER | | |
| Q18 | RETURN | PLAY NAVIGATION/RETURN | 0.7 | 0.5 | 0.7 | 0.3 | | | HDD | | | | | | | | | |
| Q19 | PROGRAM TABLE | PROGRAM TABLE | 1.0 | 1.0 | 1.0 | 1.0 | | | | | | RECORD | RECORDING MODE | RECORDING MODE | | RECORDING MODE | DVD POWER | |
| Q20 | RECORDING RESERVATION | ENTER | 1.0 | 0.0 | 0.7 | 0.0 | | | | | | | | | | | RECORDING MODE | |

MANIPULATION ERROR PATTERN 24: CONFIRM RECORDING RESERVATION

MANIPULATION ERROR PATTERN 25: CONFIRM RECORDING RESERVATION

*FIG.22*

| MANIPULATION INFORMATION | MANIPULATION ERROR PROBABILITY | | | |
|---|---|---|---|---|
| | E95 LEARNING GROUP | PSX LEARNING GROUP | XS43 LEARNING GROUP | GROUP WITHOUT LEARNING |
| HDD | 25.0% | 100.0% | 100.0% | 100.0% |
| RECORD | 0.0% | 33.3% | 0.0% | 0.0% |
| CURSOR | 0.0% | 0.0% | 0.0% | 25.0% |
| PROGRAM TABLE | 0.0% | 0.0% | 57.1% | 25.0% |

MANIPULATION BUTTON NAME 33
34
31
32

OPERATION CHECK INFORMATION PROVIDING DEVICE AND ELECTRONIC DEVICE USING THE SAME

TECHNICAL FIELD

The present invention relates to a user support technology for manipulating hardware and/or software. More specifically, the present invention relates to an apparatus for, when a user is to manipulate hardware and/or software for an apparatus, program, service or the like, providing a confirmation request for, or an explanation on, such a manipulation in a manner adapted to the user.

BACKGROUND ART

Manipulation support provided by an apparatus to the user is roughly classified into two types: support of automatically providing a manipulation confirmation request before a function of the apparatus is executed, and support of displaying a help screen or a help explanation when demanded by the user after a function is executed.

Generally with the support of automatically providing a manipulation confirmation request before a function of the apparatus is executed, a manipulation explanation or a manipulation confirmation request sentence regarding a function prepared beforehand by a designer is automatically displayed. For example, a manipulation explanation on a newly added function is displayed; or when the function is, for example, to delete a content, an explanation is displayed that it is impossible to return to the pre-manipulation state once the function is executed.

By contrast, the support of displaying a help explanation or the like after a function is executed is generally carried out as follows. The user makes a demand for a help after executing a "function that the user does not know well how to use", and the apparatus displays a help explanation in response to the demand. This type of support presents the same help explanation to any user as long as the function for which the help is demanded is the same. Therefore, this type of support has a problem that a manipulation explanation cannot be provided in accordance with the manipulation skill (learning level) of the user.

In order to address this problem, Patent Document No. 1 discloses an adaptive information output method which is capable of providing a manipulation explanation in accordance with the learning level of the user. This method is carried out as follows. When a user demands a help for a function manipulation, the learning level of the user on the function manipulation is estimated based on the similarity thereof with the function manipulation of the apparatus used in the past by the user. Then, a manipulation explanation is made in accordance with the estimated learning level. In this manner, an explanation adapted to the user who demanded the help can be provided.

Patent Document No. 1: Japanese Laid-Open Patent Publication No. 2004-38867

DISCLOSURE OF THE INVENTION

Problems to be Solved by the Invention

However, with the support of automatically providing a manipulation confirmation request before a function is executed, the same explanation is displayed for the same function regardless of the skill or knowledge of the user on the manipulation. Therefore, a manipulation confirmation request may be provided even for a function familiar to the user, or no manipulation confirmation request may be provided even for a function which is not familiar to the user. Thus, the manipulation support adapted to the user cannot be provided.

Regarding the support of displaying a help after a function is executed, the method described in Patent Document No. 1 requires the apparatus to receive a demand for a function explanation from the user who does not know how to use the function. The user needs to conduct a troublesome work of inputting an explanation demand to the apparatus each time he/she is in trouble on how to use a function.

If the apparatus can correctly estimate, beforehand, a manipulation for which the user is likely to make an error and automatically display a manipulation confirmation request or a manipulation explanation suitable to the user, it is not necessary to receive a demand from the user. Provision of an explanation on, or a confirmation request for, a manipulation for which the user is likely to make an error, before a function is executed, is effective for providing a manipulation comprehension support or for preventing a manipulation error.

An object of the present invention is to provide an apparatus for, when a user makes an input manipulation, providing a manipulation support of, for example, estimating a manipulation for which the user is likely to make an incorrect input with a high probability, in accordance with the knowledge of the user, and automatically displaying a manipulation confirmation request for such a manipulation.

Means for Solving the Problems

An electronic apparatus according to the present invention comprises a storage section which stores a database including a plurality of manipulation error patterns; an input section for receiving a manipulation of a user; a determination section for determining whether or not to provide a confirmation request for the manipulation based on at least one of the manipulation error patterns corresponding to the user, which is determined by referring to the database based on manipulation information which indicates the received manipulation and correction information which indicates whether or not to correct the manipulation; and an output section for outputting a signal for presenting a manipulation confirmation request message when it is determined to provide the confirmation request for the manipulation. Each of the manipulation error patterns is information on a manipulation error on each of functions of a manipulation target apparatus, the information being defined based on a manipulation experience of a plurality of users each having the manipulation experience with an apparatus other than the manipulation target apparatus.

The electronic apparatus further comprises a calculation section for determining the at least one of the manipulation error patterns corresponding to the user by referring to the database based on the manipulation information and the correction information, and calculating a manipulation error probability of the determined at least one manipulation error pattern for each piece of manipulation information. The determination section may determine whether or not to provide the confirmation request for the manipulation based on the manipulation error probability for the manipulation information.

A device for providing a manipulation confirmation information is usable for an electronic apparatus including an input section for receiving a manipulation of a user, the electronic apparatus operating in accordance with the manipulation. The device may comprise a storage section which stores a database including a plurality of manipulation error patterns; a determination section for determining whether or not to provide a confirmation request for the manipulation based on at least one of the manipulation error patterns corresponding to the user, which is determined by referring to the database based on manipulation information which indicates the received manipulation and correction information which indicates whether or not to correct the manipulation; and an output section for outputting a signal for presenting a manipulation confirmation request message when it is determined to provide the confirmation request for the manipulation. Each of the manipulation error patterns is information on a manipulation error on each of functions of a manipulation target apparatus, the information being defined based on a manipulation experience of a plurality of users each having the manipulation experience with an apparatus other than the manipulation target apparatus.

The device further comprises a calculation section for determining the at least one manipulation error pattern corresponding to the user by referring to the database based on the manipulation information and the correction information, and calculating a manipulation error probability of the determined at least one manipulation error pattern for each piece of manipulation information. The determination section may determine whether or not to provide the confirmation request for the manipulation based on the manipulation error probability for the manipulation information.

When it is determined not to provide the confirmation request for the manipulation, the output section may output an instruction signal for causing an execution of an operation based on the received manipulation.

The manipulation confirmation information providing device may further comprise a probability information storage section for retaining information on the probability.

The determination section may determine whether or not to provide the confirmation request for the manipulation based on a comparison result between the manipulation error probability for the manipulation information and a predetermined threshold value.

The manipulation confirmation information providing device may further comprise a sorting section for sorting and outputting the manipulation information and the correction information based on the received manipulation, the sorting section outputting the manipulation information based on the received manipulation and outputting the correction information based on at least one of a time period elapsing after the manipulation is received and a manipulation received after the manipulation information is generated.

In the case where a signal including the manipulation confirmation request message is output, when a finalization manipulation is performed for finalizing the manipulation for which the confirmation request was provided, the sorting section may output the manipulation information which indicates the manipulation for which the confirmation request was provided and the correction information which indicates that the manipulation is not corrected.

In the case where a signal including the manipulation confirmation request message is output, when a cancellation manipulation is performed for canceling the manipulation for which the confirmation request was provided, the sorting section may output the manipulation information which indicates the manipulation for which the confirmation request was provided and the correction information which indicates that the manipulation is corrected.

When a cancellation manipulation is performed for canceling the received manipulation, the sorting section may output the manipulation information which indicates the manipulation and the correction information which indicates that the manipulation is corrected.

When any further manipulation is not received for a predetermined time period after the manipulation is received, the sorting section may output the manipulation information which indicates the manipulation and the correction information which indicates that the manipulation is corrected.

In the database stored in the storage section, each of the manipulation error patterns may be defined based on a manipulation experience of a plurality of users who have manipulated one of a plurality of manipulation target apparatuses which have different manipulation systems.

Each of the manipulation target apparatuses may have at least a predetermined number of functions which are common with the apparatus with which the plurality of users each already have the manipulation experience.

Each of the manipulation target apparatuses may have at least a predetermined number of button labels which are different from those of the apparatus with which the plurality of users each already have the manipulation experience.

Regarding at least one of the common functions, the number of manipulation steps necessary for executing the function in each of the manipulation target apparatuses may be different from the number of manipulation steps necessary for executing the function in the apparatus with which the plurality of users each already have the manipulation experience.

In the database stored in the storage section, each of the manipulation error patterns may be information on a manipulation error on at least one of the functions which is common with the apparatus with which the plurality of users each already have the manipulation experience.

The manipulation confirmation information providing device further comprises an update section for updating the probability. When the determination section determines to provide the confirmation request for the manipulation, the update section may update the probability for the manipulation information on the manipulation in accordance with a total number of times that the confirmation request for the manipulation has been provided.

When the confirmation for the manipulation is provided a plurality of times, the update section may decrease the probability for the manipulation information on the manipulation at a certain ratio.

The manipulation confirmation information providing device further comprises an update section for updating the probability. The update section may increase the probability for the manipulation information on the manipulation in accordance with a time period in which the manipulation has not been performed.

When the manipulation is not performed for at least a predetermined time period, the update section may increase the probability for the manipulation information on the manipulation at a certain ratio.

Effects of the Invention

According to the present invention, a plurality of manipulation error patterns are prepared as information on a manipulation error on each of functions of a manipulation target apparatus, the information being defined based on a manipulation experience of a plurality of users (a manipulation experience with an apparatus other than the manipulation target apparatus). Then, the manipulation error pattern to which each user corresponds is determined based on the manipulation history of the user. Based on the corresponding manipulation error pattern, it is determined whether or not to provide a manipulation confirmation request. The apparatus automatically provides a manipulation confirmation request for a manipulation for which the user is likely to make an error, in a manner adapted to the user. Therefore, the user does not need to demand a help for a function that the user does not know well how to use. The apparatus does not provide a manipulation confirmation request for a manipulation for which the user is not likely to make an error. Therefore, the load on the user of responding to an unnecessary manipulation confirmation request can be alleviated. Thus, a meticulous manipulation support for the user is realized.

BRIEF DESCRIPTION OF THE DRAWINGS

FIG. 4(a) shows a specific data structure of a device manipulation DB 39, and FIG. 4(b) shows a general data structure of the device manipulation DB 39.

FIG. 5 is a flowchart showing a procedure of the processing of determining a manipulation error group candidate.

FIG. 15 is a flowchart showing a procedure of the processing executed by the information providing unit 200.

FIG. 16 shows an example of updating the manipulation error probability based on an output of a manipulation confirmation request.

FIG. 19 shows an example of a question sheet with correct answers used by the examinees to do the learning.

FIG. 21 shows an example of the results of the experiment performed in accordance with the procedure.

FIG. 22 shows a part of manipulation error probabilities on each piece of manipulation information based on the results of the experiment.

DESCRIPTION OF THE REFERENCE NUMERALS

Figure 1:
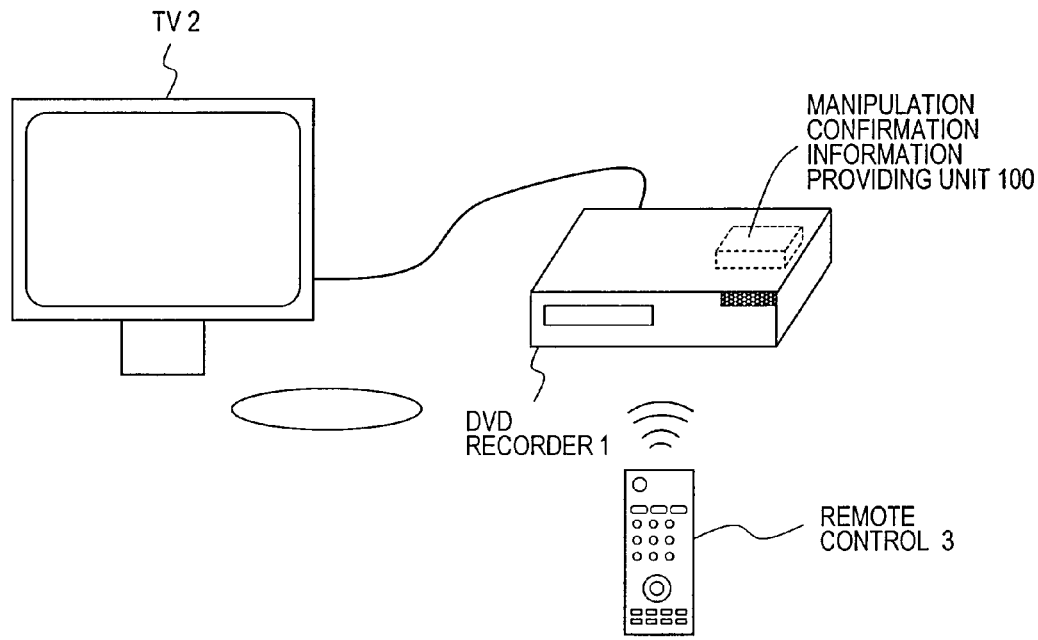
FIG. 1 shows a structure of an environment in which a DVD recorder 1 according to an embodiment of the present invention is usable.

1 DVD recorder
2 TV
3 Remote control
39 Device manipulation database (DB)
100 Manipulation confirmation information providing unit 100
101 Input section
102 Input content sorting section
103 Control section
104 Database storage section
105 Manipulation error probability calculation section
106 Probability information storage section
107 Manipulation confirmation request determination section
108 Output section
110, 111 CPU
200 Manipulation confirmation information providing unit
201 Manipulation confirmation request update section

BEST MODE FOR CARRYING OUT THE INVENTION

Hereinafter, an electronic apparatus and a manipulation confirmation information providing device according to the present invention will be described by way of embodiments with reference to the attached drawings.

First, with reference to FIG. 17 through FIG. 22, a manipulation experiment performed by the present inventors using a DVD recorder will be described to explain the basis of the principle of the present invention. Then, with reference to FIG. 1 through FIG. 16, embodiments of the present invention will be described.

1. Outline of the Experiment

In this experiment, examinees first learned how to manipulate an apparatus which was not an evaluation target (DVD recorder), and then how the ratio of correct answers on remote control manipulations on a DVD recorder as an evaluation target was changed was observed.

The examinees were divided into a group of people who would learn function manipulations on the DVD recorder and a group of people who would not learn such function manipulations. The examinees of the group who would learn the function manipulations first learned how to manipulate any one of four models (four DVD recorders) which were not evaluation targets, and then took a manipulation test of 20 questions on the other three apparatuses. By contrast, the examinees of the group who would not learn the function manipulations did not learn how to manipulate any of the apparatuses, and took a manipulation test of the same 20 questions on the four DVD recorders.

The ratios of correct answers were compared for each of the models. As a result, it was confirmed that the examinees who had learned how to manipulate different models before the test made different manipulations on the same manipulation question on the same model. From this result, the following was derived: an apparatus used by a user in the past can be estimated based on to which questions the user made a correct or incorrect input; and once the apparatus used by the user in the past is estimated, it can be predicted for each user whether the user will make a certain manipulation in a correct or incorrect way even when the user makes the manipulation for the first time.

2. Details of the DVD Recorder Manipulation Experiment

An objective of this experiment is to observe a change in the ratio of correct answers in the remote control manipulation test on the DVD recorders under the conditions that the learning on device manipulations is conducted before the test.

The experiment was conducted on 15 college students as examinees who were provided with four DVD recorders different in, for example, the manipulation system as well as interfaces of remote control, GUI and apparatus display. The four DVD recorders were DMR-EH60 (Panasonic), DMR-E95H (Panasonic), PSX DESR-7700 (Sony) and RD-XS43 (Toshiba). Any of the examinees did not own any DVD recorder and did not know how to manipulate a DVD recorder in detail at the beginning.

Figure 17:
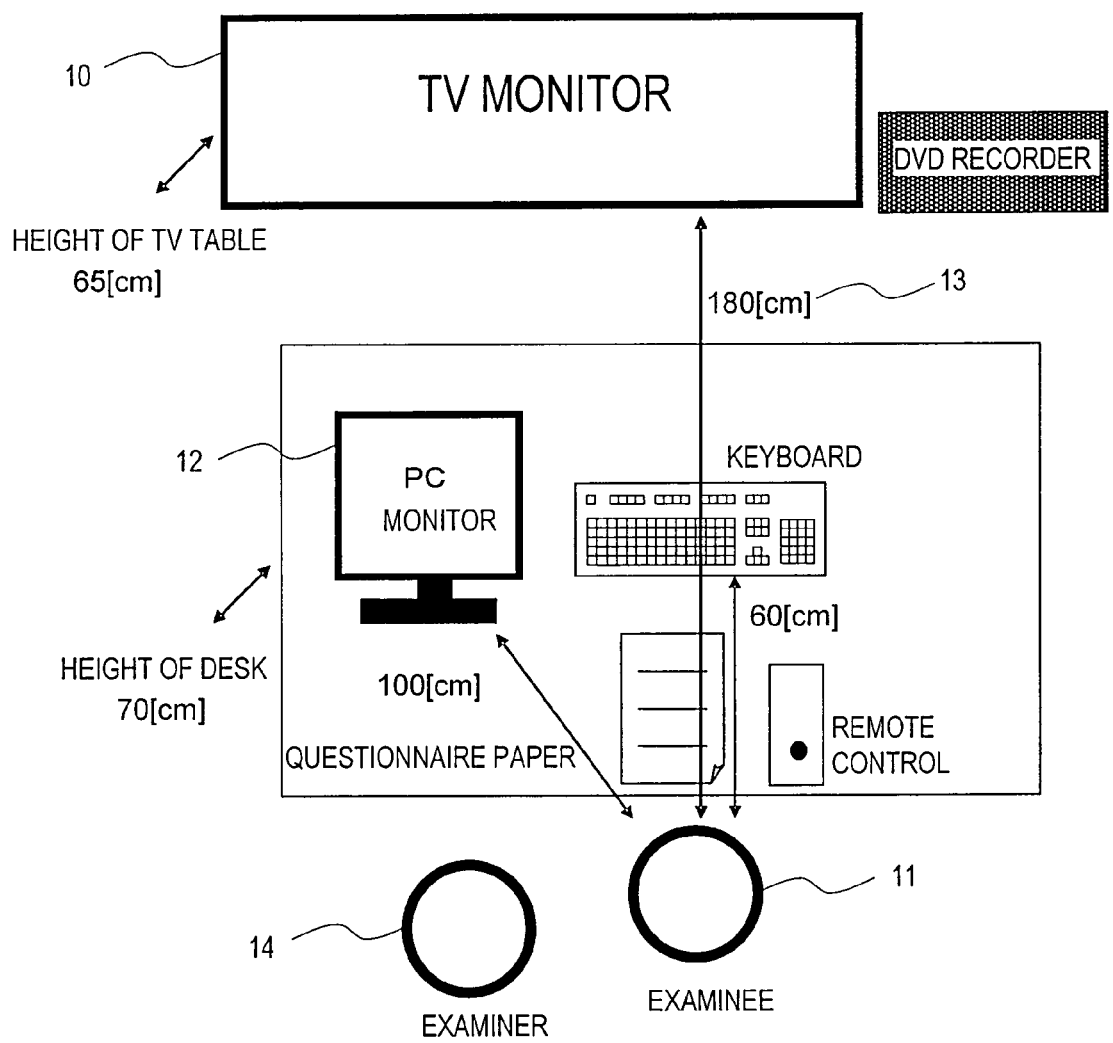
FIG. 17 shows an arrangement of an experimental apparatus.

FIG. 17 shows an arrangement of an apparatus used for the experiment. A TV 10 is TH-36DH200 (Panasonic). The TV 10 is provided to display remote control manipulation results. A PC monitor 12 is Flex Scan L685 17-inch liquid crystal display (EIZO). The PC monitor 12 is provided to present test questions to an examinee 11.

A distance 13 between the examinee 11 and the screen of the TV 10 was 180 cm, which was determined as a natural, usual distance for watching TV at home. In order to present the questions to the examinee 11 and allow the examinee 11 to manipulate the apparatus, an examiner 14 was on stand-by behind the examinee 11.

Figure 18:
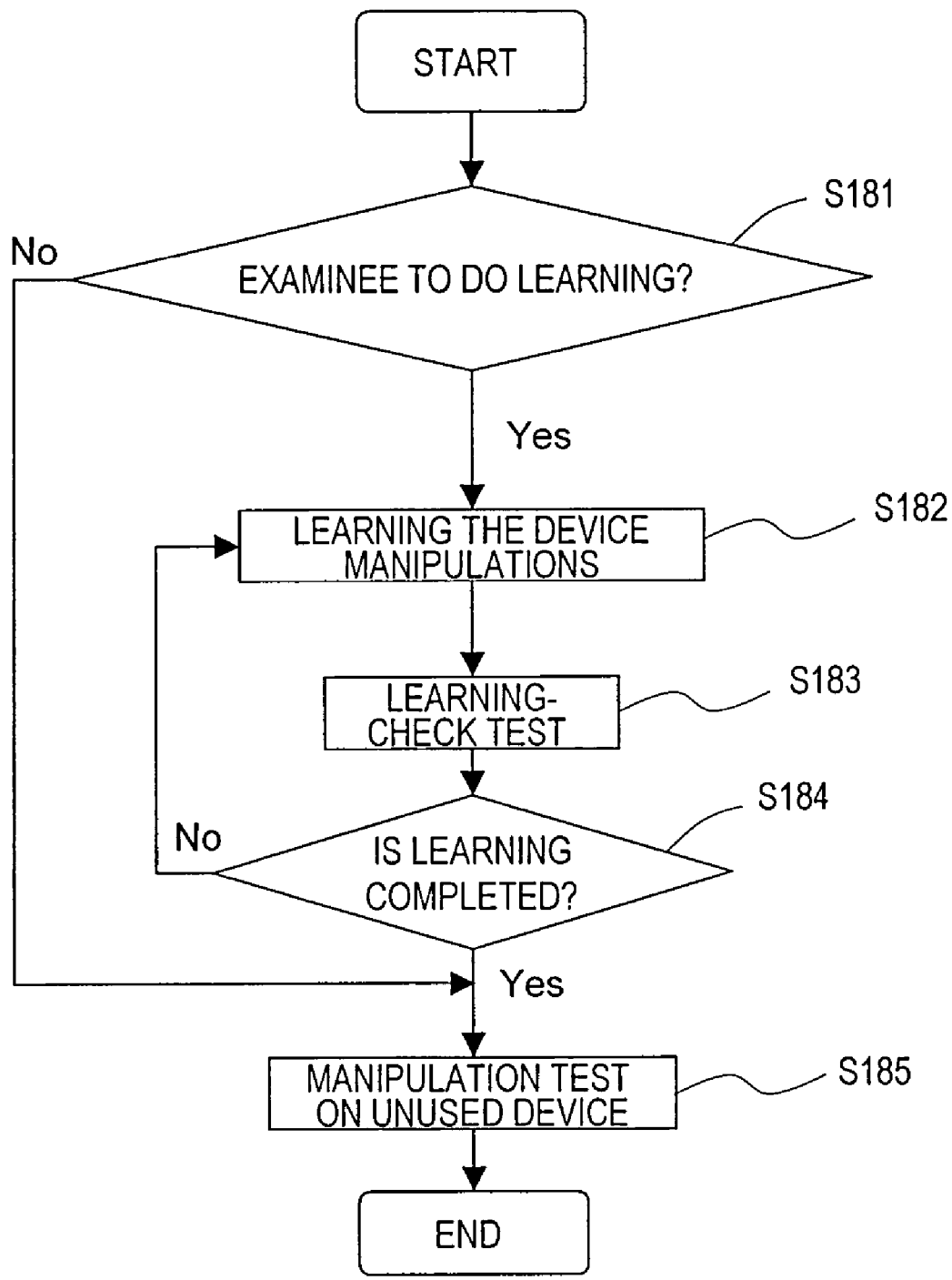
FIG. 18 is a flowchart showing a procedure of a manipulation experiment.

FIG. 18 shows a procedure of the manipulation experiment. In step S181, it was first determined whether the examinee would do the learning or not. In this experiment, 12 out of the 15 examinees were to do the learning, and the other three examinees were not to do the learning.

In step S182, the examinees determined as being for the learning in step S181 learned how to manipulate one DVD recorder. The 12 examinees were divided into four groups each of three examinees, and each group learned either one of DMR-EH60, DMR-E95H, PSX DESR-7700 and RD-XS43.

FIG. 19 shows an example of a question sheet with correct answers used by the examinees to do the learning. The question sheet describes which manipulation needs to be performed in which state in order to realize a certain state. In order to allow the examinees to do the learning, the question sheet with correct answers shown in FIG. 19 was given to each examinee, so that each examinee freely did the learning while actually manipulating the remote control. The examinees were allowed to do the learning for 20 minutes.

In step S183, a learning-check test was performed on the examinees who did the learning in step S182 in the following manner. The same questions as those used for the learning in step S182 were sequentially output to the PC monitor 12 shown in FIG. 17. The examinees pressed a button of the remote control for each question, and the examiner recorded whether the manipulation was correct or incorrect.

Referring to FIG. 18 again, in step S184, it was determined whether each examinee who did the learning completed the learning in the following manner. When all the answers of an examinee in the learning-check test performed in step S183 were correct, such an examinee was determined to have completed the learning. By contrast, when even one of the answers of an examinee in the learning-check test was incorrect, such an examinee was determined not to have completed the learning. Such an examinee was returned to step S182 to conduct the learning again.

In step S185, a manipulation test was performed regarding the evaluation target apparatuses on the examinees determined to have completed the learning in step S184 and the examinees determined as being not for the learning in step S181. The examinees determined to have completed the learning in step S184 took the manipulation test using the other three DVD recorders as evaluation targets, whereas the examinees determined as being not for the learning in step S181 took the manipulation test using all the four DVD recorders as evaluation targets. For the manipulation test, the same questions as those used in step S183 were used.

Figure 20:
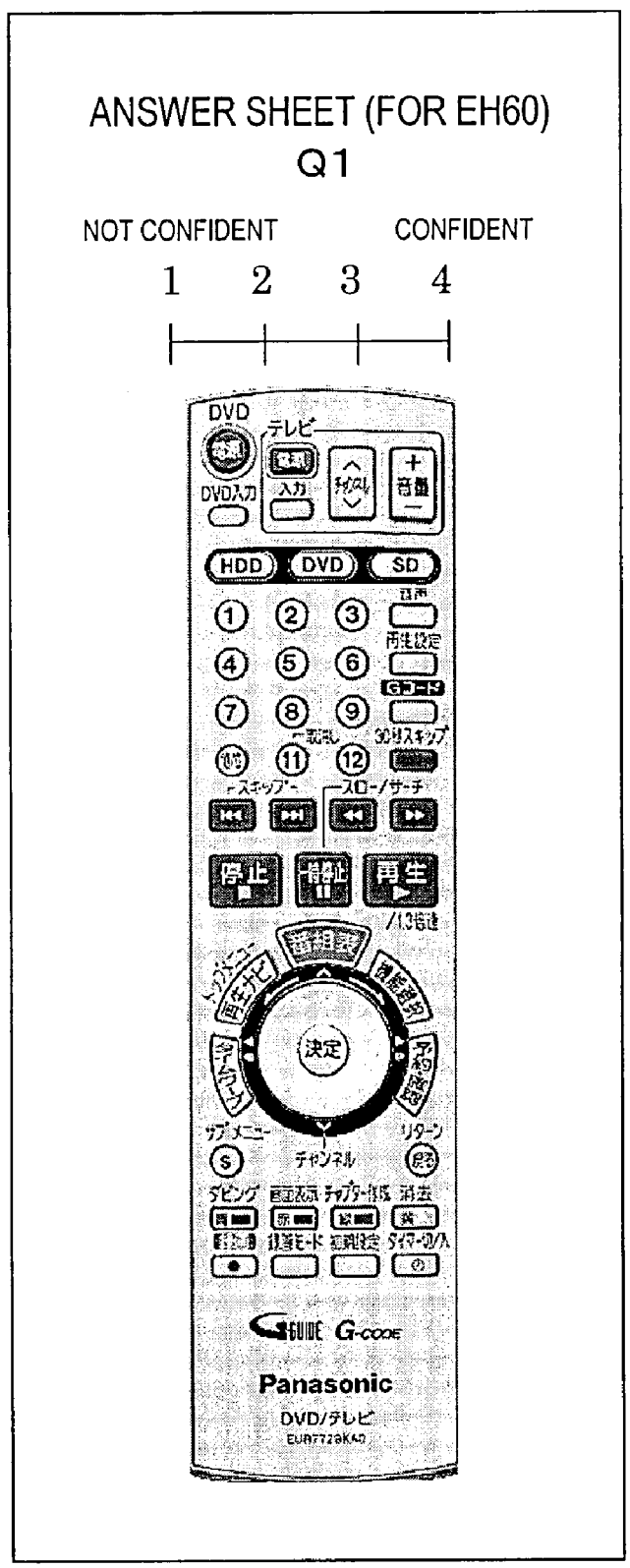
FIG. 20 shows an example of an answer sheet.

FIG. 20 shows an example of an answer sheet. The answer was provided as follows. When each question is displayed on the PC monitor 12, each examinee first writes down his/her confidence level for his/her answer to the question and then marks a button of the remote control on the answer sheet which he/she believes to be a correct button to press. Since each examinee writes down his/her answer on the answer sheet instead of actually manipulating the remote control, the examinee does not know the reaction of the apparatus as the result of the manipulation. Therefore, such a situation can be prevented that the knowledge of the user on the manipulation of the evaluation target apparatus is changed by the reaction of the apparatus to the manipulation made by the user. Thus, the apparatuses can be directly compared and evaluated on each question only based on the difference in the learning conditions made before the test.

FIG. 21 shows an example of the results of the experiment performed in the above-described procedure. FIG. 21 lists a correct answer ratio 20 for each question and manipulation information 21 of the different learning groups obtained with EH60. The "manipulation information" is information on an input manipulation performed by a user. For example, when the user presses the "play" button, the manipulation information is "play".

A function 23 in the table shows a function of the DVD recorder for each question. Each of the blank sections in the table indicates that the examinee made the correct manipulation (the manipulation shown in a "correct manipulation 22" in the table). Each of the non-blank sections indicates that the examinee made a manipulation error, and the specific manipulation made is also shown.

A comparison of the correct answer ratios in FIG. 21 for each question shows that the function for which a manipulation error is made and the manipulation made by mistake are different among the learning groups. For example, a manipulation error pattern 24 in FIG. 21 shows that to Q7 on the function of switching the HDD, the examinees of the group who learned how to manipulate E95H did not make a manipulation error, but the examinees of the other groups made a manipulation error. Namely, the apparatus used by each examinee in the past can be estimated based on the function for which the examinee made a manipulation error.

For example, a manipulation error pattern 25 in FIG. 21 shows that to Q10 on the function of displaying a list of recorded programs, the examinees of the group who learned how to manipulate PSX pressed the "HDD" button by mistake, whereas the examinees of the group who learned how to manipulate XS43 pressed the "program table" button by mistake. From this result, the apparatus used by each examinee in the past can be estimated also based on the manipulation information which indicates the type of manipulation made by mistake.

From the above-described results, it was found that different individuals make a manipulation error for different functions with a new apparatus because the different individuals have a past manipulation experience with different apparatuses. It was also found that the apparatus used by each user in the past can be estimated based on the manipulation non-error/error pattern on the functions, and a function for which each user is likely to make a manipulation error can be predicted, such a function being different in accordance with the apparatus used by each user in the past.

However, in an actual device manipulation, what is obtained from the user is a remote control manipulation and not a function. Namely, merely based on the manipulation information, it cannot be distinguished whether the user pressed the button as providing a function intended or pressed the button inadvertently. Therefore, by merely using the database obtained for each function as described above, i.e., merely from the manipulation of the user, the apparatus used by the user in the past cannot be estimated; or the function for which the user is likely to make a manipulation error cannot be predicted, such a function being different in accordance with the apparatus used by each user in the past.

With this situation, the above-described results of the experiment were analyzed by the button manipulated, instead of by the question. FIG. 22 shows a part of manipulation error probabilities on each piece of manipulation information based on the results of the experiment. "HDD", etc. each indicate the manipulation information corresponding to a manipulation button name 33. The "manipulation error probability" is the probability at which the manipulation information input by the user is input as a result of a manipulation error.

According to FIG. 22, the manipulation error probability of each button manipulation which provides manipulation information is different among different learning groups. For example, among the manipulation error probabilities for the manipulation information "record", only the numerical value in section 31 of the PSX learning group shows 33.3%. This means that only the examinees who learned how to manipulate PSX manipulated the "record" button by mistake. By contrast, among the manipulation error probabilities for the manipulation information "program table", the numerical values in sections 32 which indicate the results of the XS43 learning group and the group with no learning are not 0.0%. It is appreciated that the examinees of these groups manipulated the "program table" button by mistake.

Thus, the type of manipulation error is different by function and by apparatus learned beforehand. From this result, it is understood that the manipulation error group can be estimated only based on the type of manipulation error. Namely, once it is found whether a manipulation indicated by certain manipulation information is correct or not, the apparatus used by the user in the past can be estimated and a manipulation support adapted to the estimated apparatus can be provided.

For example, referring to the manipulation error probabilities for the manipulation information "record" in FIG. 22, only the examinees who learned PSX manipulated the "record" button by mistake. Therefore, the apparatus used by the users who pressed the "record" button by mistake can be estimated to be PSX.

Once it is found that the user used PSX in the past, a further estimation can be made as follows. For example, it is assumed that the user pressed, for the first time, the "HDD" button of the apparatus currently used. Referring to manipulation error probabilities for the manipulation information "HDD" in FIG. 22, a manipulation error probability 34 of the PSX learning group is 100%. Thus, it can be estimated that the press on the HDD button is very highly possibly an error.

Using this estimation result, the operation of the apparatus can be switched to be suitable to the user. Namely, when the HDD button is pressed, an explanation of a function realized by the button or a manipulation confirmation request may be provided before the execution of the function, instead of immediately executing the function corresponding to the HDD button. According to this way of thinking, a comprehension support or a manipulation confirmation request can be automatically provided before the function is executed even for a manipulation performed for the first time.

Summarizing the above, the following two pieces of knowledge was obtained from this experiment.

1. The apparatus used in the past can be estimated based on whether a correct or incorrect manipulation was performed.

2. Once the apparatus used in the past is found, a manipulation for which each user is likely to make an error can be predicted, such a manipulation being different by user.

Based on the above pieces of knowledge, a plurality of groups of users who make a manipulation error in different systems are prepared, and a plurality of manipulation error patterns are defined based on the manipulation experience of the users of the groups. Based on the manipulation history and the manipulation error pattern of a user, it is determined to which group the user belongs. After the determination is made, the manipulation error probability for each manipulation is estimated based on the manipulation error pattern of the group. In this manner, a manipulation for which each user is likely to make an error can be predicted, such a manipulation being different by user.

Namely, using the knowledge, it can be determined whether or not to provide a support for a manipulation estimated to be done by mistake, only based on the manipulation history and the manipulation information indicating whether a correct or incorrect manipulation was made. This is applicable to the processing of providing a manipulation support adapted to each user without a demand from the user being received.

3. Description of the Embodiments of the Present Invention

Figure 2:
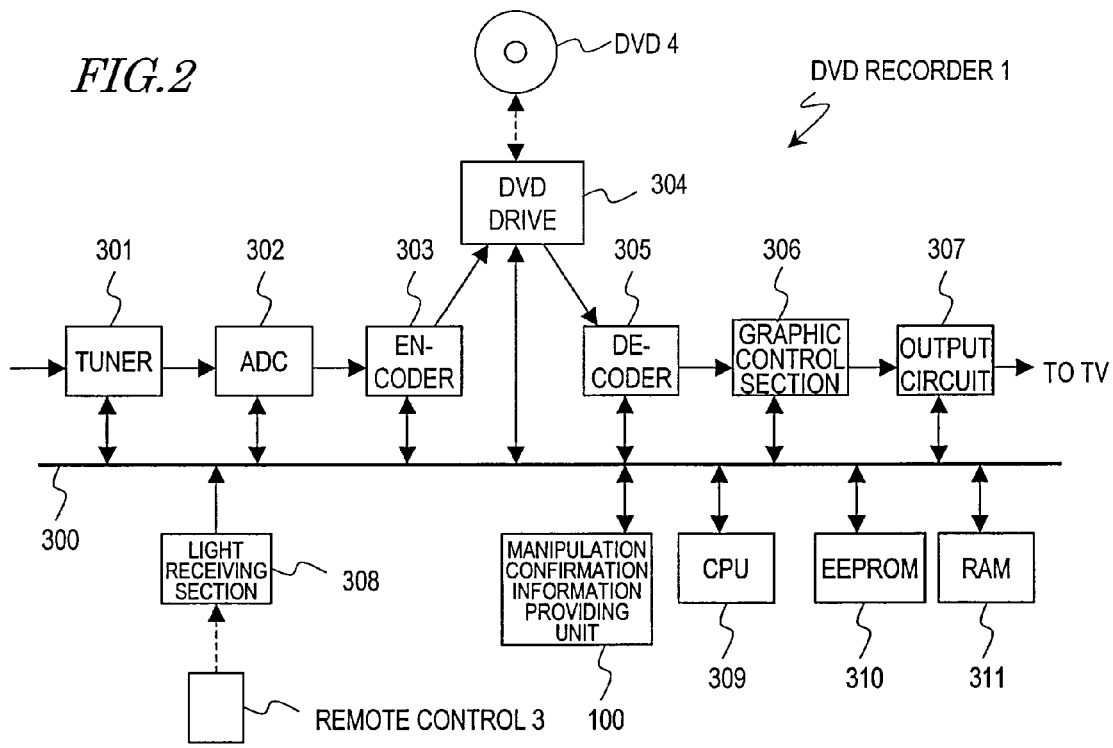
FIG. 2 shows a hardware structure of the DVD recorder 1.

Before describing each of the embodiments, with reference to FIG. 1 and FIG. 2, an environment in which a manipulation confirmation information providing device and an electronic apparatus including the same according to the present invention can be used will be first described. In the following description, the electronic apparatus is a DVD recorder.

FIG. 1 shows a structure of an environment in which a DVD recorder 1 according to this embodiment can be used. The DVD recorder 1 has a function of recording a broadcast program on a DVD (not shown) and reproducing a broadcast program recorded on a DVD. The reproduced video and audio data is displayed on a screen of a TV 2 and is output from a speaker thereof. The user can manipulate the DVD recorder 1 using a remote control 3 or buttons of a main body (not shown) to execute various functions of the DVD recorder 1.

The DVD recorder 1 has a manipulation confirmation information providing unit 100 built therein. When the user manipulates the DVD recorder 1 using the remote control 3 or the like, the manipulation confirmation information providing unit 100 (hereinafter, referred to as the "information providing unit 100") refers to a database to calculate the probability at which the manipulation received from the user is an error and determines, based on the probability, whether or not to provide a confirmation request to inform the user that, for example, the manipulation is possibly an error. When it is determined that the confirmation request is to be provided, a video signal or an audio signal for presenting a manipulation confirmation request message is output. Such a signal is output, for example, as video or audio data from the screen or the speaker of the TV 2. The user can watch the manipulation confirmation request screen or the like to determine whether or not the manipulation is suitable for executing the function that he/she desires.

FIG. 2 shows a hardware structure of the DVD recorder 1. The DVD recorder 1 (hereinafter, referred to as the "recorder 1") is capable of writing any data on, and reading any data from, a DVD 4. The DVD 4 may be a disk specialized for reproduction, in which case the recorder 1 only reads data. The DVD recorder 1 may have a hard disk drive (HDD), in which case the DVD recorder 1 is capable of reading any data on, and reading any data from, a hard disk.

The recorder 1 includes a bus 300, a tuner 301, an A-D converter 302, an encoder 303, a DVD drive 304, a decoder 305, a graphic control section 306, an output circuit 307, a light receiving section 308, a CPU 309, an EEPROM 310, a RAM 311, and the information providing unit 100.

Hereinafter, the function of each element will be described. The bus 300 is a signal line. The bus 300 connects the other elements of the recorder 1 to each other to transmit signals in the recorder 1.

The tuner 301 receives a broadcast wave signal from an antenna (not shown) and selects a station based on the frequency to extract a signal of a necessary program. The A-D converter 302 converts a signal from the tuner 301 into a digital signal and supplies the digital signal to the encoder 303. Upon receiving an instruction to start recording, the encoder 303 performs, for example, compression encoding of the supplied digital data into the MPEG-2 format and outputs the data as encoded data.

The DVD drive 304 includes, for example, a disk tray, an optical head, a spindle motor, a rotation shaft for transmitting the rotation of the spindle motor to a disk, a controller for controlling the operation of the entire drive and the like (none of which is shown). Upon receiving an instruction to start recording, the DVD drive 304 writes the encoded data on the DVD 4. Upon receiving an instruction to start reproduction, the DVD drive 304 reads the encoded data written on the DVD 4.

Upon receiving an instruction to start reproduction, the decoder 305 extends the encoded data read by the DVD drive 304, converts the data into non-compressed video or audio data, and supplies the data to the graphic control section 306.

The graphic control section 306 superimposes video data in an internal memory (not shown) on the non-compressed video data to realize an On Screen Display (OSD) function. The graphic control section 306 also outputs a video signal for displaying a predetermined message or screen based on the received manipulation confirmation information. For example, when a specified user presses a predetermined button, the graphic control section 306 outputs a signal for video data including a manipulation explanation sentence or a video signal representing a synthesis of various menu images and videos (digital baseband signal). The output circuit 307 converts the input digital video signal/audio signal into an analog signal and outputs the analog signal. The analog signal is output to, for example, the TV 2.

The light receiving section 308 receives infrared rays from the remote control 3 and transmits an instruction based on the user manipulation, for example, an instruction to start/stop the recording, an instruction to start/stop the reproduction of a recorded program or the like to the CPU 309 or to the manipulation confirmation information providing unit 100 via the bus 300.

The CPU 309 is a central processing unit for controlling the operation of the entire recorder 1. The CPU 309 uses the EEPROM 310 and the RAM 311 to control the overall processing including signal flows in the recorder 1. The CPU 309 reads and executes a program stored on the EEPROM 310 to generate a control signal for realizing the processing based on the program, and outputs the control signal to the elements via the CPU bus 300.

The EEPROM 100 is an electrically erasable and programmable nonvolatile memory, and has a software program for controlling the recorder 1 stored thereon. Various flowcharts shown in the attached drawings and referred to in the descriptions of the embodiments are each implemented as a software program. The EEPROM 310 may store a software program which is executed by the CPU (described later) in the information providing unit 100 described later.

The RAM 311 has a work area for storing data necessary for the CPU 309 to execute a program. For example, the CPU 309 uses the CPU bus 300 to read a program from the EEPROM 310 onto the RAM 311 and execute the program.

A computer program is distributed on the market as being recorded on a recording medium such as a CD-ROM or the like, or transmitted via an electric communication line such as the Internet or the like. Thus, a computer system constructed using a PC or the like is allowed to operate as an electronic apparatus having functions equivalent to those of the recorder 1 according to this embodiment or as an apparatus having functions equivalent to those of the information providing unit 100.

The information providing unit 100 is implemented as a board having one integrated circuit or a plurality of integrated circuits mounted thereon. In the following description, the information providing unit 100 is implemented as a board having one integrated circuit mounted thereon.

Hereinafter, embodiments of the information providing unit 100 according to the present invention when being implemented in the recorder 1 will be described.

Embodiment 1

Hereinafter, with Reference to FIG. 3, the information providing unit 100 according to this embodiment will be described.

Figure 3:
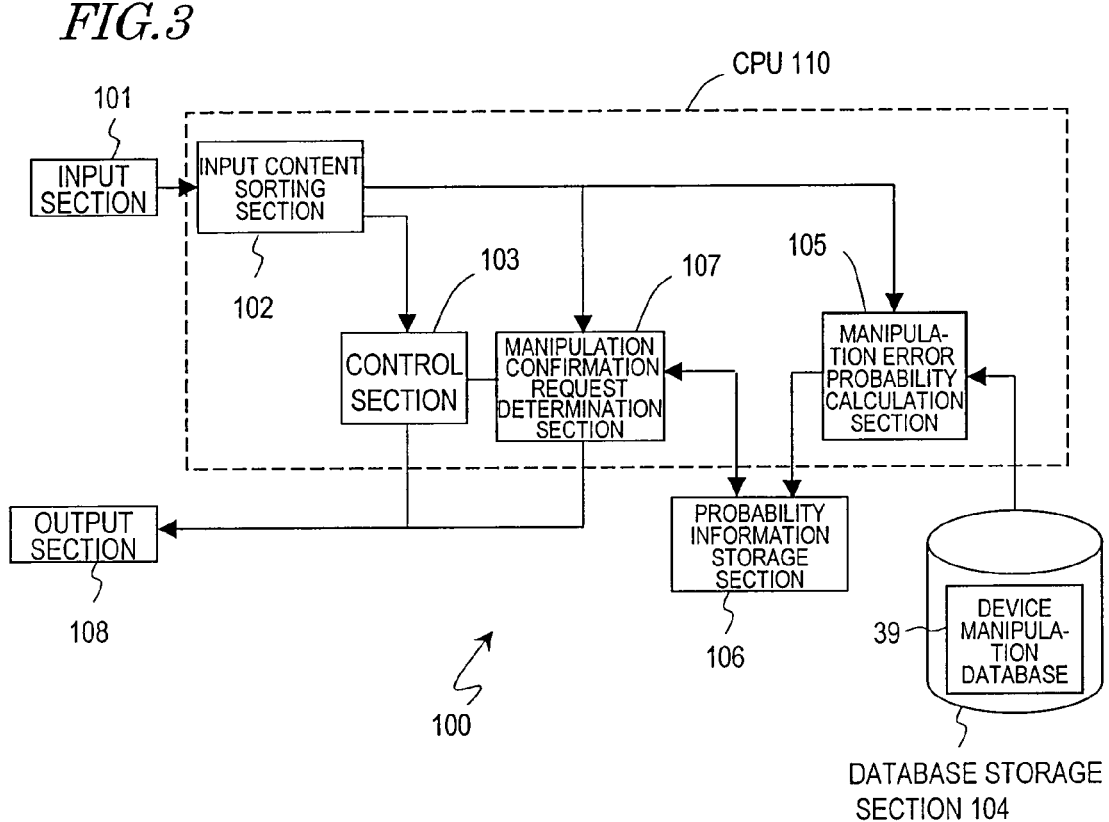
FIG. 3 shows a structure of functional blocks of an information providing unit 100 according to Embodiment 1.

FIG. 3 shows a structure of functional blocks of the information providing unit 100 according to this embodiment. The information providing unit 100 includes an input section 101, a database storage section 104, a probability information storage section 106, an output section 108, and a CPU 110.

First, an operation outline of the information providing unit 100 will be described. The database storage section 104 has stored thereon a database including manipulation error patterns (information on manipulation errors) on each function of the recorder 1 defined based on a manipulation experience of a plurality of users. Herein, the "manipulation experience" means an experience of manipulating a recorder other than the recorder 1 which is a manipulation target (for example, an experience of manipulating a recorder of a different manufacturer). The CPU 110 refers to the database based on information on a manipulation history of a user, namely, the manipulation information indicating the manipulation of the user and correction information indicating whether or not to correct the manipulation. Then, the CPU 110 determines which manipulation error pattern is to be applied to the user.

Using the manipulation error pattern, the CPU 110 calculates the probability of the input manipulation of the user being a manipulation error.

Next, the CPU 110 determines, based on the probability, whether or not to provide a confirmation request for the manipulation. When it is determined that a confirmation request is to be provided, the CPU 110 outputs an instruction signal for presenting a manipulation confirmation request message through the output section 108.

For example, for a manipulation having a relatively high probability of being an error, the CPU 110 outputs an instruction signal for displaying a manipulation confirmation request "Are you sure to proceed with this manipulation?" before an operation based on the manipulation is executed. Thus, a manipulation confirmation request can be provided for a manipulation for which the user is likely to make an error.

By contrast, for a manipulation having a relatively low probability of being an error, the CPU 110 does not output an instruction signal for displaying a manipulation confirmation request and instructs the CPU 309 of the recorder 1 to execute an operation based on the manipulation. Since a manipulation confirmation request is not provided to the user each time, the load on the user of inputting the response can be alleviated.

1. Description of Each Element of the Manipulation Confirmation Information Providing Unit According to Embodiment 1

Now, the structure of the information providing unit 100 will be described in detail.

The input section 101 connects the information providing unit 100 to the bus 300 of the recorder 1. The input section 101 obtains information which specifies an input manipulation from the user received by the recorder 1.

An "input manipulation" is a manipulation performed on the recorder 1 using the remote control 3, a mouse, a keyboard, buttons (not shown) of the main body of the recorder 1 or the like. A selection of an icon using GUI is also an input manipulation. For example, when the user selects the "play" icon on the GUI screen by the "enter" button of the remote control, the input manipulation is not a press on the "enter" button of the remote control but is a selection of the "play" icon. Both when the "play" button is pressed and when the "play" icon is selected, the input section 101 obtains information which specifies the same input manipulation.

The CPU 110 controls the operation of the information providing unit 100. Hereinafter, the CPU 110 will be described as an integrated circuit separated from the CPU 309 of the recorder 1, but this is merely an example. The CPU 309 of the recorder 1 may be allowed to execute a computer program instead of the CPU 110, in which case each function of the CPU 110 described later can be realized only by the CPU 309. In such a case, the information providing unit 100 is realized as software, and hardware such as a board, circuit or the like for the information providing unit 100 is not necessary.

Hereinafter, a structure of the CPU 110 will be described in detail. The CPU 110 includes an input content sorting section 102, a control section 103, a manipulation error probability calculation section 105, and a manipulation confirmation request determination section 107. This means that when considering the CPU 110 from the viewpoint of functions, the CPU 110 operates as the input content sorting section 102, the control section 103, the manipulation error probability calculation section 105, and the manipulation confirmation request determination section 107. The CPU 110 operates in accordance with the procedure of a computer program to be executed and thus acts as these sections.

The input content sorting section 102 (hereinafter, referred to as the "sorting section 102") sorts information which specifies an input manipulation received from the input section 101 as a combination of "manipulation information" and "immediately previous manipulation correction information".

The "manipulation information" is information which specifies the input manipulation performed by the user. For example, when the user presses the "play" button of the remote control 3, the manipulation information is "play".

The "immediately previous manipulation correction information" is information which indicates whether or not the user corrects the immediately previous manipulation, and is either "corrected" or "not corrected". An immediately previous manipulation that the user does not correct is referred to as a "non-corrected manipulation", whereas an immediately previous manipulation that the user corrects is referred to as a "corrected manipulation". When the user presses the "play" button and then the "return" button for returning to the previous menu, instead of the "enter" button for starting reproduction, the immediately previous manipulation correction information is "corrected".

A specific manner of sorting is, for example, as follows. The sorting section 102 determines whether or not the input manipulation is a manipulation confirmation request result. The "manipulation confirmation request result" is a manipulation performed by the user in response to the manipulation confirmation request screen which has been output. When the input is not a manipulation confirmation request result, the sorting section 102 sorts the input manipulation received from the input section 101 as "manipulation information, non-corrected". When the input is a manipulation confirmation request result and the user executed the manipulation for which the confirmation request was provided, the sorting section 102 sorts the input manipulation as "immediately previous manipulation information, non-corrected". When the input is a manipulation confirmation request result and the user did not execute the manipulation for which the confirmation request was provided, the sorting section 102 may sort the input manipulation as "immediately previous manipulation information, corrected".

For example, it is assumed that when the "recording mode" button is pressed, the following manipulation confirmation request message is output: "The quality of the image to be recorded is determined. The quality can be selected from four types: XP mode (high quality), SP mode (standard quality), LP mode (long time) and EP mode (longer time). Do you want to set the quality?". The manipulation performed by the user of selecting "yes" or "no" is a manipulation confirmation request result. When "yes" is pressed, this means that the quality setting is the manipulation which the user wanted to do before the display of the message. Therefore, the sorting section 102 sorts the manipulation information as "recording mode" and sorts the immediately previous manipulation correction information as "non-corrected". When "no" is pressed, this means that the quality setting is not the manipulation which the user intended to do before the display of the message. Therefore, the sorting section 102 sorts the manipulation information as "recording mode" and sorts the immediately previous manipulation correction information as "corrected".

When the input manipulation of the user is a press on a button to cancel the input manipulation performed immediately previously, the sorting section 102 may determine the manipulation information based on the immediately previous input manipulation and may sort the immediately previous manipulation correction information as "corrected". When the user presses the "recording mode" button and then the "return" button of the remote control, the sorting section sorts the manipulation information as "recording mode" and sorts the immediately previous manipulation correction information as "corrected".

When a certain time period elapses before the user makes a next input manipulation after making the first input manipulation, the sorting section may determine the first input manipulation as the manipulation information and sort the immediately previous manipulation correction information as a manipulation error, namely, "corrected". For example, when 10 seconds or longer elapses before the user makes a next input manipulation after pressing the "function select" button, the input sorting section sorts the manipulation information as "function select" and sorts the immediately previous manipulation correction information as "corrected".

When the manipulation confirmation request determination section 107 described later determines not to provide a manipulation confirmation request, the control section 103 instructs the recorder 1 to execute the operation corresponding to the manipulation information received from the sorting section 103. For example, when "play" is input as the manipulation information, the control section 103 instructs the recorder 1 to reproduce the program recorded on the recorder 1. By contrast, when the manipulation confirmation request determination section 107 determines to provide a manipulation confirmation request, the control section 103 instructs the recorder 1 to output a manipulation confirmation request screen before instructing the recorder 1 to execute the operation corresponding to the manipulation information.

The manipulation error probability calculation section 105 (hereinafter, referred to as the "calculation section 105") refers to a device manipulation database 39 described later based on the manipulation information and the immediately previous manipulation correction information obtained from the sorting section 102 and thus determines at least one manipulation error pattern corresponding to the user. Then, the calculation section 105 calculates the manipulation error probability of the determined at least one manipulation error pattern for each piece of manipulation information, and creates a manipulation error probability table.

The manipulation confirmation request determination section 107 (hereinafter, referred to as the "determination section 107") determines whether or not to provide a manipulation confirmation request based on the manipulation error probability for the manipulation information.

The calculation section 105 and the determination section 107 will be described in more detail after describing a structure of the device manipulation database 39 and the like in detail.

The database storage section 104 holds the device manipulation database (DB) 39. The device manipulation DB 39 includes a manipulation error pattern of each manipulation error group for each function of the recorder 1. The "manipulation error pattern of each manipulation error group" is information on a manipulation error for each function of the manipulation target apparatus (i.e., the recorder 1), which is defined based on the manipulation experience of a plurality of users.

The probability information storage section 106 stores the manipulation error probability table calculated by the calculation section 105.

Now, with reference to FIGS. 4(a) and (b), the device manipulation DB 39 will be described in more detail.

FIG. 4(b) shows a specific data structure of the device manipulation DB 39. As shown in FIG. 4(a), the device manipulation DB 39 defines a manipulation error pattern corresponding to each of manipulation error groups A through D. For example, for the manipulation error group A, a manipulation error pattern 40 is defined. Function 41 in the table indicates functions of the apparatus, for example, display of "program table", display of "recorded program list", "record", "play", and the like. A correct manipulation on the remote control for realizing each function is the "correct manipulation".

Herein, the "manipulation error group" means a group of users (user group) who exhibit a similar manipulation error pattern when performing a function of the apparatus currently used as a result of being influenced by the functions and the manipulation methods of the apparatus with which the users have a manipulation experience.

Herein, the "manipulation error pattern" is a set of manipulation information which indicates the manipulation performed by each user for each function, and is defined by the button actually manipulated by the user such as the "record" button or the "play" button. The manipulation information may indicate a correct manipulation or an incorrect manipulation (i.e., a manipulation error).

For example, the manipulation error pattern 40 of the manipulation error group A is same as the correct manipulation for "program", "recorded program list" and "record" and thus indicates correct manipulations for these functions. By contrast, the manipulation error pattern of the manipulation error group B indicates that a menu button is pressed for "recorded program list" and thus indicates a manipulation error for this function.

The device manipulation database may be created as follows. Examinees are collected for each of apparatuses currently used or apparatuses used in the past. Then, a manipulation experiment is conducted by giving a question for each of the functions of the apparatus for which a manipulation confirmation request is to be provided. The manipulation information is recorded and put to a database. Namely, a question is given for each function of the apparatus for which a manipulation confirmation request is to be provided, and manipulation information is obtained based on the manipulation of the users to the question. A database is obtained by storing each function and the manipulation information in association with the function.

FIG. 4(b) shows a general data structure of the device manipulation DB 39. The elements corresponding to those in FIG. 4(a) bear the same reference numerals therewith. The following description will be given using the general device manipulation DB 39 shown in FIG. 4(b).

In the following, manipulation information indicating a manipulation error will be especially referred to as the "manipulation error information". For example, if the user presses the "record" button by mistake for executing a function of making a recording reservation from the program table, instead of pressing the "enter" button which is a correct manipulation, "record" is the manipulation error information.

Now, a method for constructing a manipulation error group will be described.

As described above in the section of "Details of the DVD recorder manipulation experiment", when manipulation errors are made on models such as E95H and PSX, the function for which a manipulation error is made or the type of manipulation error is different among different models. Accordingly, the users having a manipulation experience with different models can be classified into different manipulation error groups.

A plurality of users having a manipulation experience with apparatuses which have at least a certain number of same functions may be classified into the same manipulation error group. For example, like the method described above in the section of "DVD recorder manipulation experiment", users having a manipulation experience with DVD recorders with similar model numbers may be classified into the same manipulation error group. A video recorder and an HDD recorder, which are recording/reproduction apparatuses, have many same functions; and also a video player and a DVD player, which are reproduction apparatuses, also have many same functions. The users having a manipulation experience with such similar types of apparatuses may be classified into the same manipulation error group. Thus, as compared with conducting an experiment on a model-by-model basis, the number of manipulation error groups can be reduced. As a result, the amount of work required for the experiment and the capacity of the device manipulation database can be reduced.

By contrast, in the case where apparatuses have at least a certain number of same functions but at least a certain number of button labels thereof attached to the remote control, GUI, apparatus and the like are different, the users having a manipulation experience with such apparatuses may be classified into different manipulation error groups. For example, the button corresponding to the function of displaying a list of recorded programs is labeled differently by manufacturer, like "play navigation", "program navigation" or the like. Such a difference in the label put on the button to be manipulated for the same function is considered to be one cause of a manipulation error made by the users. Thus, it is effective to construct manipulation error groups from the viewpoint of whether the functions and the button labels are common or not.

In the case where apparatuses have at least a certain number of same functions but at least a certain number of functions thereof have different numbers of manipulation steps, the users having a manipulation experience with such apparatuses may be classified into different manipulation error groups. For example, the manipulation corresponding to the "function of displaying a list of recorded programs" is different by manufacture, like a one-button manipulation, or a two- or more-button manipulation or the like. Such a difference in the number of manipulation steps for the same function is considered to be one cause of a manipulation error made by the users. Thus, it is effective to construct manipulation error groups from the viewpoint of whether the functions and the manipulation step numbers are common or not.

For creating a device manipulation database, a manipulation test may be performed only on the functions which are common between the apparatus for which a manipulation confirmation request is to be provided and the apparatus with which the users have a manipulation experience. The reason is as follows. For example, regarding a new function such as "time warp" which is not implemented in any apparatus with which the users have a manipulation experience, the users may not know the meaning of the function rather than conducting a manipulation error. Therefore, such a function can be more effectively handled as a function for which a manipulation confirmation request should be provided regardless of the manipulation experience. By conducting an experiment only on the common functions, the number of questions given to the examinees can be reduced.

Now, with reference to FIG. 5 through FIG. 8, a procedure of the processing executed by the calculation section 105 to calculate the manipulation error probability will be described. The "manipulation error probability" means the probability of manipulation errors being made for the manipulation, which is calculated by re-aggregating the device manipulation DB 39 for each input manipulation.

The calculation section 105 executes roughly two types of main processing, which are the processing of determining a manipulation error pattern corresponding to the user currently manipulating and the processing of calculating the manipulation error probability corresponding to the determined manipulation error pattern.

In the following, with reference to FIG. 5 and FIG. 6, the processing of determining the manipulation error pattern which is executed by the calculation section 105 will be first described. The processing of determining the manipulation error pattern may be rephrased as the processing of estimating the manipulation error group to which the user belongs and determining a candidate for the group. Then, with reference to FIG. 7 and FIG. 8, the processing of calculating the manipulation error probability based on the determined manipulation error pattern will be described.

FIG. 5 shows a procedure of the processing of determining a manipulation error group candidate. FIGS. 6(a) and (b) show an example of how the manipulation error group candidate is determined by the procedure shown in FIG. 5.

In step S51, the calculation section 105 obtains manipulation information from the sorting section 102. For example, when a button B1 is pressed, the calculation section 105 obtains manipulation information B1.

In step S52, the calculation section 105 obtains immediately previous manipulation correction information again from the sorting section 102. For example, when the "return" button is pressed after the button B1 is pressed, the immediately previous manipulation correction information is "corrected".

In step S53, the calculation section 105 obtains the device manipulation DB 39 from the database storage section 104.

In step S54, the calculation section 105 obtains manipulation error group candidates in the device manipulation DB 39. When the apparatus is manipulated for the first time, all the manipulation error groups described in the device manipulation database may be stored as an initial value of the manipulation error group candidate.

For example, when the manipulation information B1 is obtained, the calculation section 105 obtains, from the manipulation error groups A through D shown in FIG. 6(a), the manipulation error group A(51), the manipulation error group B(52) and the manipulation error group C(53), which include B1 in the manipulation error pattern thereof, as the manipulation error group candidates.

Then, in step S55 in FIG. 5, the calculation section 105 selects manipulation information which is the same as the manipulation information obtained in step S51 from the manipulation error patterns of the received manipulation error group candidates. For example, based on the manipulation error patterns of the manipulation error group A(51), the manipulation error group B(52) and the manipulation error group C(53) shown in FIG. 6, the calculation section 105 selects the manipulation information which is the same as the manipulation information B1(50).

In step S56, the calculation section 105 compares the manipulation information selected for each manipulation error group in step S55 and the correct manipulation for the selected manipulation information, and classifies each of all the pieces of selected manipulation information as a correct manipulation or a manipulation error.

Figure 6:
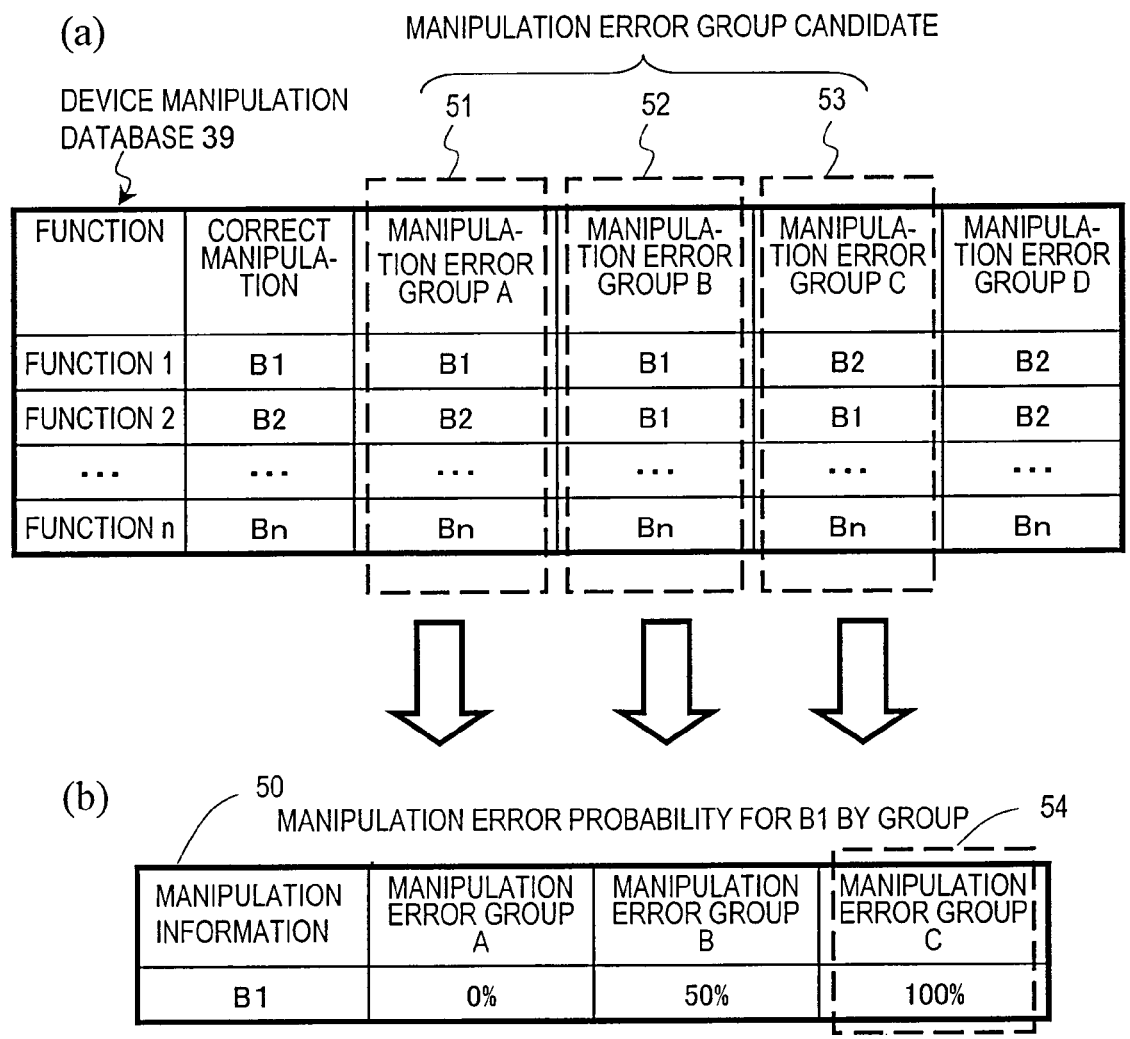
FIGS. 6(a) and (b) show an example of determining a manipulation error group candidate in accordance with the procedure of FIG. 5.

For example, referring to the manipulation error pattern of the manipulation error group candidate B(52) shown in FIG. 6, two pieces of manipulation information are the same as the manipulation information B1 (it is assumed that the manipulation error pattern of the manipulation error group candidate B does not include any more manipulation information B1). These pieces of manipulation information are each compared with the value in the section of correct manipulation. As a result, for function 1, the manipulation information B1 is the correct manipulation; whereas for function 2, the manipulation information B1 is a manipulation error.

In step S57, the calculation section 105 calculates the ratio (probability) at which manipulation error information is included in all the pieces of manipulation information selected for each manipulation error group candidate in step S55. The calculation may be performed using expression 1.

$$p_g^o = \left( \frac{BI_g^o}{BC_g^o + BI_g^o} \right) \times 100 \quad \text{[Expression 1]}$$

where the left term $P^o{}_g$ is the probability at which the manipulation information o is a manipulation error in manipulation error group g, $BC^o{}_g$ is the total number of cases where the manipulation information o is the "correct manipulation" in manipulation error group g, and $BI^o{}_g$ is the total number of cases where the manipulation information o is the "manipulation error" in manipulation error group g.

For example, FIG. 6(*b*) shows a manipulation error probability of each of the manipulation error group candidates A, B and C for manipulation information B1, which is calculated by the calculation section 105. Regarding the manipulation error group candidate B(52), the calculation section 105 calculates the manipulation error probability for the manipulation information B1 as 50%. The reason is that among the two pieces of data on the manipulation information B1, one press is the correct manipulation and one press is a manipulation error.

In step S58, the calculation section 105 determines whether the manipulation information obtained in step S51 is corrected or non-corrected. For the determination, the calculation section 105 may use the immediately previous manipulation correction information obtained in step S52 as it is. When the immediately previous manipulation correction information indicates "corrected" as in the above-described example, the processing advances to step S60. By contrast, when the immediately previous manipulation correction information indicates "non-corrected", the processing advances to step S59.

In step S59, the calculation section 105 selects a manipulation error group candidate having a manipulation error probability calculated in step S57 which is equal to or smaller than a threshold value. The threshold value may be set to be a relatively small value (for example, 30%). The reason is that because the immediately previous manipulation correction information indicates "non-corrected", the user is considered to have a low manipulation error probability for this manipulation information. It is appropriate to set the threshold value to be relatively small and select a manipulation error group candidate having a low manipulation error probability for this manipulation information.

In the case where there are a plurality of candidates having a manipulation error probability equal to or smaller than the threshold value, all such candidates may be selected or a candidate having the lowest manipulation error probability may be selected. In the case where there is no candidate having a manipulation error probability equal to or smaller than the threshold value, no candidate is selected.

In step S60, the calculation section 105 selects a manipulation error group candidate having a manipulation error probability calculated in step S57 which is equal to or greater than a threshold value. The threshold value may be set to be a relatively large value (for example, 70%). The reason is that because the immediately previous manipulation correction information indicates "corrected", the user is considered to have a high manipulation error probability for this manipulation information. It is appropriate to set the threshold value to be relatively large and select a manipulation error group candidate having a high manipulation error probability for this manipulation information.

In the case where there are a plurality of candidates having a manipulation error probability equal to or greater than the threshold value, all such candidates may be selected or a candidate having the highest manipulation error probability may be selected. In the case where there is no candidate having a manipulation error probability equal to or greater than the threshold value, no candidate is selected.

For example, it is assumed that the threshold value is set to be 70%. Among the manipulation error groups shown in FIG. 6(*b*), the group having a manipulation error probability exceeding 70% is the manipulation error group C(54) having a manipulation error probability of 100%. Thus, the user is estimated to belong to the manipulation error group C.

In step S61, the calculation section 105 stores the manipulation error group candidate selected in step S59 or the manipulation error group candidate selected in step S60 in an internal register or the like. The stored manipulation error group candidate is treated as a manipulation error group candidate to be obtained in step S54 when the next manipulation is performed.

Each time a manipulation is received from the user, the procedure shown in FIG. 5 is executed. In this manner, the manipulation error group to which the user is estimated to belong can be determined.

Now, a method of calculating the manipulation error probability by the calculation section 105 will be described. The manipulation error probability described below is a probability at which the manipulation performed by the at least one manipulation error group determined by the procedure of FIG. 5 for each piece of manipulation information is determined as a manipulation error.

Figure 7:
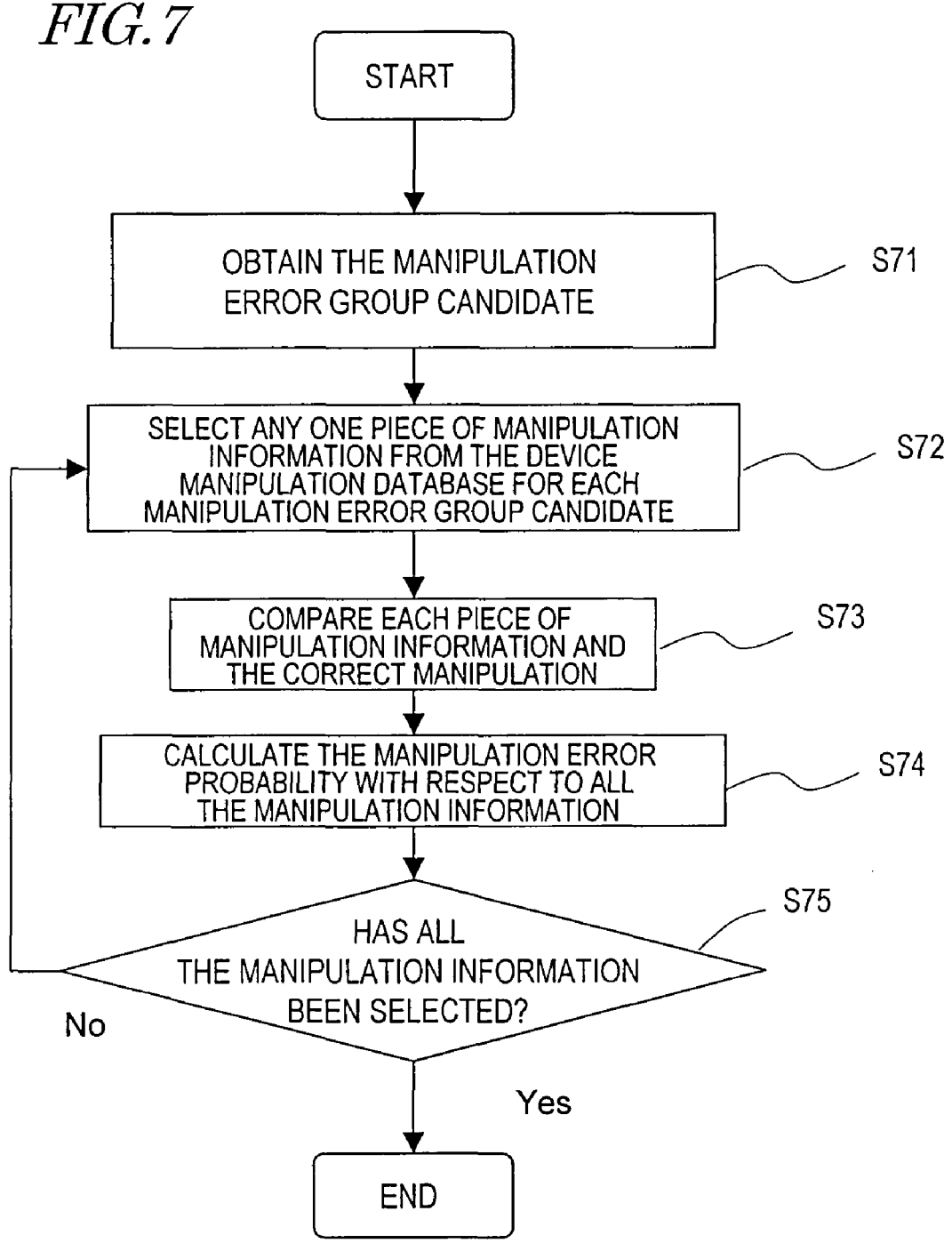
FIG. 7 is a flowchart showing a procedure of the processing of calculating a manipulation error probability from the manipulation error group candidate.
Figure 8:
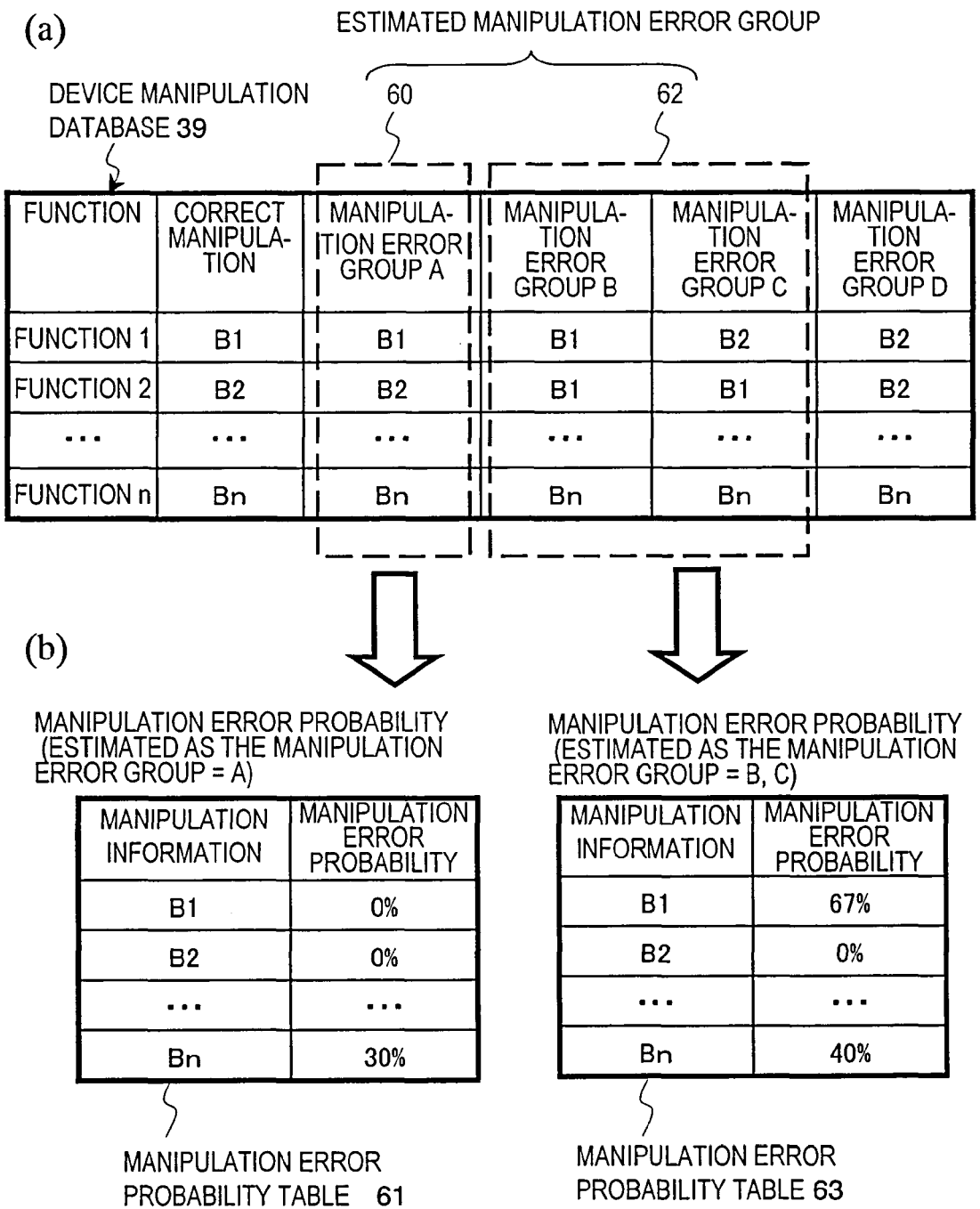
FIGS. 8(a) and (b) show an example of creating a manipulation error probability table from the estimated manipulation error groups.

FIG. 7 shows a procedure of the processing of calculating the manipulation error probability based on the manipulation error group candidate. First in step S71, the calculation section 105 obtains information on the manipulation error group candidate determined as a result of the processing of FIG. 5. For example, the calculation section 105 obtains information on the manipulation error group candidate from the internal register.

In step S72, the calculation section 105 refers to the device manipulation DB 39 to select any one type of manipulation information of the obtained manipulation error group candidate. For example, from manipulation information B1 through Bn, the calculation section 105 may first select the manipulation information B1.

In step S73, the calculation section 105 compares the selected manipulation information and the correct manipulation for the manipulation information, and classifies each of all the selected types of manipulation information as a correct manipulation or a manipulation error.

In step S74, the calculation section 105 calculates the probability at which the manipulation error information is included in all the types of manipulation information classified in step S73, i.e., the manipulation error pattern of the candidate. The calculation may be performed using expression 1 presented above. For using expression 1 for the manipulation information B1, the total number of types of manipulation information B1 included in the manipulation error pattern is the denominator, and the total number of types of manipulation information B1 which are the manipulation errors is the numerator. The calculation section 105 creates a manipulation error probability table which stores the obtained probability in association with the manipulation information.

In step S75, the calculation section 105 determines whether or not all the types of manipulation information have been selected from the entire device manipulation DB 39 for all the manipulation error group candidates, and whether or not the manipulation error probability for each type of manipulation information has been calculated. When it is determined that the manipulation error probability has not been calculated for all the types of manipulation information, the processing returns to step S72. When it is determined that the manipulation error probability has been calculated for all the types of manipulation information, the processing is terminated.

By executing steps S71 through S75, the probability at which the manipulation performed by the manipulation error group candidate determined by the processing of FIG. 5 for each type of manipulation information is a manipulation error can be calculated. Hereinafter, with reference to FIG. 8, this will be described specifically.

FIGS. 8(a) and (b) respectively show an example of creating a manipulation error probability table 61 from the estimated manipulation error group 60, and an example of creating a manipulation error probability table 62 from the estimated manipulation error group 62.

First, it is assumed that by the processing of FIG. 5, one manipulation error group A(60) is estimated to be a manipulation error group candidate and stored. In this case, the calculation section 105 uses only the manipulation error pattern of the manipulation error group A in the device manipulation DB 39 to execute the processing of steps S71 through S75 and calculates the manipulation error probability for each type of manipulation information. A set of each type of manipulation information and the calculated manipulation error probability is stored one by one, and thus the manipulation error probability table 61 such as in FIG. 8(b) is created.

Alternatively, it is assumed that by the processing of FIG. 5, a plurality of manipulation error groups B and C(62) are estimated to be manipulation error group candidates and stored. In this case, the calculation section 105 uses the manipulation error patterns of the manipulation error groups B and C in the device manipulation DB 39 to execute the processing of steps S71 through S75 and calculates the manipulation error probability for each type of manipulation information. As a result, one manipulation error probability table 63 such as in FIG. 8(b) is created. The created manipulation error probability table is stored in the probability information storage section 106.

The calculation section 105 refers to the device manipulation database 39 based on the manipulation information and the immediately previous manipulation correction information obtained from the sorting section 102 to determine at least one manipulation error pattern corresponding to each user, i.e., the manipulation error group candidate to which the user belongs. Then, the calculation section 105 selects different parts of the data described in the device manipulation DB 39 for different manipulation error groups to calculate the manipulation error probability for each type of manipulation information, and creates a manipulation error probability table.

In the case where one manipulation error group candidate cannot be specified by the input manipulation, the calculation section 105 calculates the manipulation error probability based on a plurality of candidates. A threshold value is used to exclude any manipulation error group which is determined not to include the user, and such a manipulation error group is not considered in the calculation of the manipulation error probability. In this manner, the manipulation error probability can be calculated using a plurality of manipulation error group candidates. Therefore, a manipulation error probability of a manipulation error pattern which is closest to that of the user can be calculated, and the manipulation error can be accurately estimated.

Now, the determination section 107 shown in FIG. 3 will be described in detail. The determination section 107 executes threshold processing based on the manipulation information and the immediately previous manipulation correction information received from the input content sorting section 102 and the manipulation error probability for the manipulation information in the manipulation error probability table received from the manipulation error probability storage section 106. Then, the determination section 107 determines whether or not to provide a manipulation confirmation request. The "manipulation confirmation request" is a video or audio message for requesting the manipulation confirmation. As a manipulation confirmation request, a written explanation of the manipulation corresponding to the manipulation information and a confirmation request may be displayed, for example.

When it is determined that a manipulation confirmation request is necessary, the determination section 107 determines to create and output a manipulation confirmation request. When it is determined that a manipulation confirmation request is not necessary, the determination section 107 determines not to output such a manipulation confirmation request.

Figure 9:
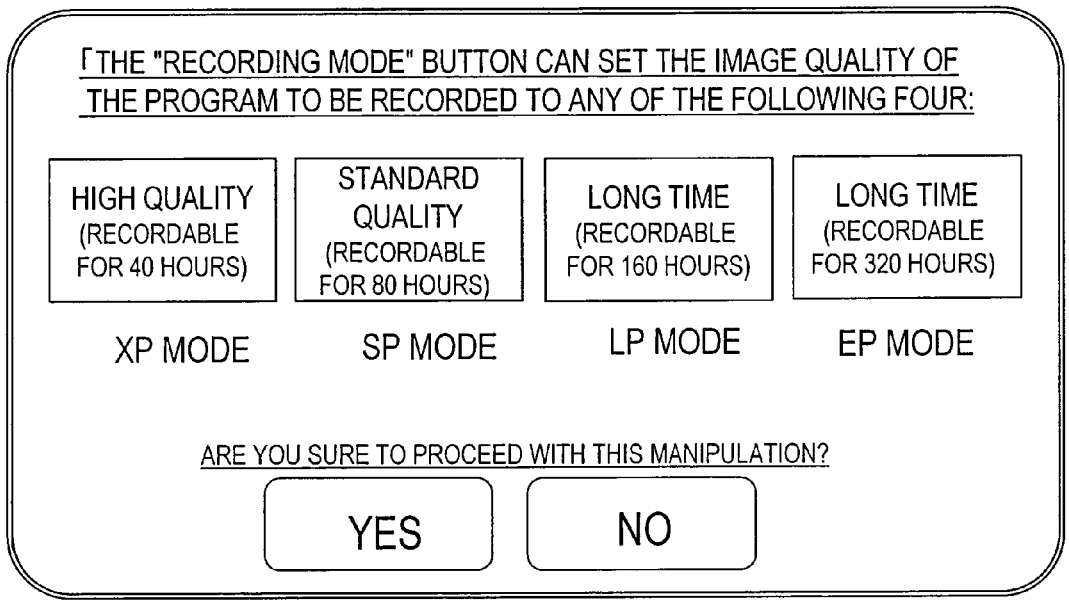
FIG. 9 shows an example of a manipulation confirmation request displayed when the recording mode button is pressed, which includes an explanation regarding manipulation information ("recording mode") and a confirmation request.
Figure 10:
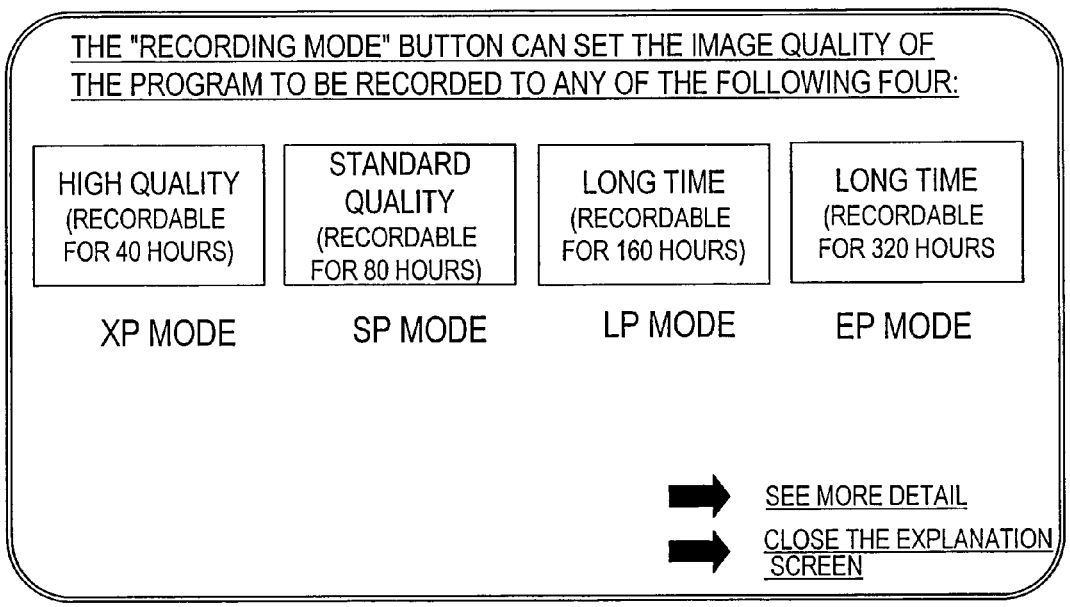
FIG. 10 shows an example of a manipulation confirmation request including only an explanation regarding manipulation information.

First, with reference to FIG. 9 and FIG. 10, an example of a manipulation confirmation request will be described. FIG. 9 is an example of a manipulation confirmation request displayed when the recording mode button is pressed, which includes a written explanation of the manipulation corresponding to the manipulation information ("recording mode") and a confirmation request. As shown in FIG. 9, when the recording button is pressed, an explanation of the manipulation is provided and a feedback from the user, i.e., "yes" or "no" is received. When "yes" is received, it is appreciated that a manipulation has been performed for finalizing the manipulation for which the confirmation request was provided, and the control section 103 outputs an instruction signal for instructing the recorder 1 to execute a program quality setting operation. When "no" is received, it is appreciated that a manipulation has been performed for canceling the manipulation for which the confirmation request was provided, and the control section 103 outputs an instruction signal for instructing the recorder 1 to return to the immediately previous manipulation screen.

Since an explanation can be given regarding a button manipulation that the user does not understand well, a comprehension support can be provided to the user for a manipulation for which the user is likely to make an error. Also regarding a manipulation such as a press on the "chapter skip" button, after which the "return" button cannot be used to return to the immediately previous state, a confirmation request can be provided before the function is performed based on the manipulation input by the user. Thus, a manipulation error can be prevented beforehand.

As a manipulation confirmation request, only a detailed manipulation explanation regarding the manipulation information may be provided, for example. FIG. 10 shows an example of the manipulation confirmation request, which presents only a manipulation explanation regarding the manipulation information. As shown in FIG. 10, when the recording mode button is pressed, a detailed explanation of the manipulation is presented to the user. Thus, a more precise comprehension support can be provided to the user for a manipulation for which the user is likely to make an error.

Figure 11:
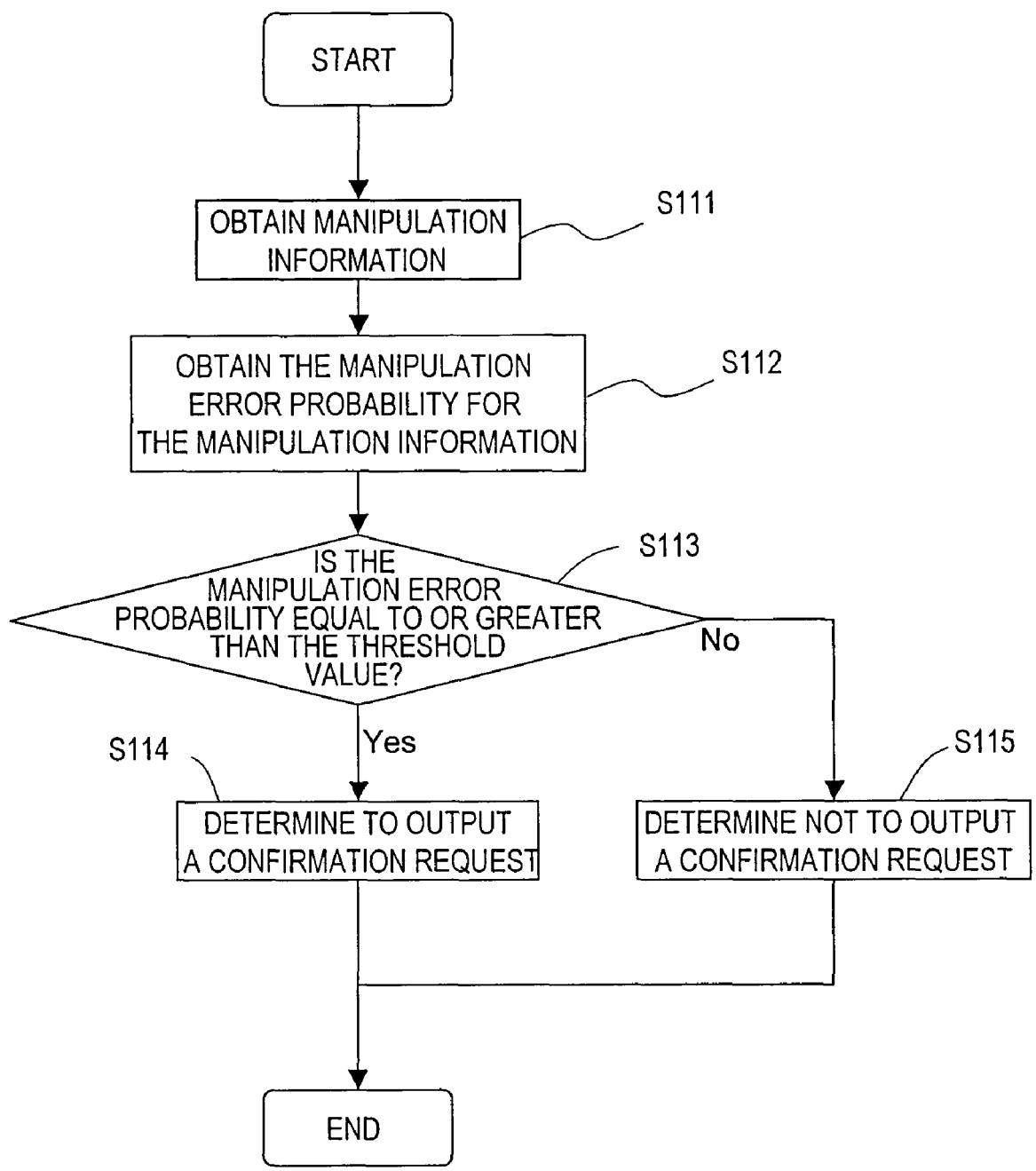
FIG. 11 is a flowchart showing a procedure of the processing executed by a determination section 107.

Now, with reference to FIG. 11, the processing of determining whether or not to present a manipulation confirmation request, which is executed by the determination section 107 will be described in detail. FIG. 11 shows a procedure of the processing executed by the determination section 107.

In step S111, the determination section 107 obtains manipulation information from the input sorting section 102. Then, in step S112, the determination section 107 obtains the manipulation error probability for the manipulation information obtained in step S111. Specifically, the determination section 107 refers to the manipulation error probability table (for example, the manipulation error probability tables 61 and 63 shown in FIG. 8(b)) stored in the manipulation error probability storage section 106 to read the manipulation error probability for the manipulation information obtained in step S111.

In step S113, the determination section 107 determines whether or not the manipulation error probability obtained in step S112 is equal to or greater than a threshold value. The threshold value used for the determination may be a fixed value which is set by the designer in advance, for example, 80%. When the manipulation error probability is equal to or greater than the threshold value, the processing advances to step S114. When the manipulation error probability is smaller than the threshold value, the processing advances to step S115.

In step S114, the manipulation of the user is estimated to be an error. Therefore, the determination section 107 determines to output a manipulation confirmation request. As a result, the determination section 107 creates a message for the manipulation confirmation request and outputs a signal for the message from the output section 108.

By contrast, in step S115, the manipulation of the user is estimated not to be an error. Therefore, the determination section 107 determines not to output a manipulation confirmation request. Upon receiving this determination result, the control section 103 outputs an instruction signal for instructing an execution of the operation corresponding to the manipulation information to the recorder 1 via the output section 108. The recorder 1 may make a display on a display device such as the TV 2.

By executing steps S111 through S115, the manipulation confirmation request determination section 107 can estimate whether or not the manipulation corresponding to the manipulation information received from the input content sorting section 102 is an error using a threshold value, and thus can determine whether or not to output a manipulation confirmation request.

2. Description of an Operation of the Manipulation Confirmation Information Providing Unit According to Embodiment 1

Now, with reference to FIG. 12, a procedure of the overall processing executed by the information providing unit 100 will be described.

Figure 12:
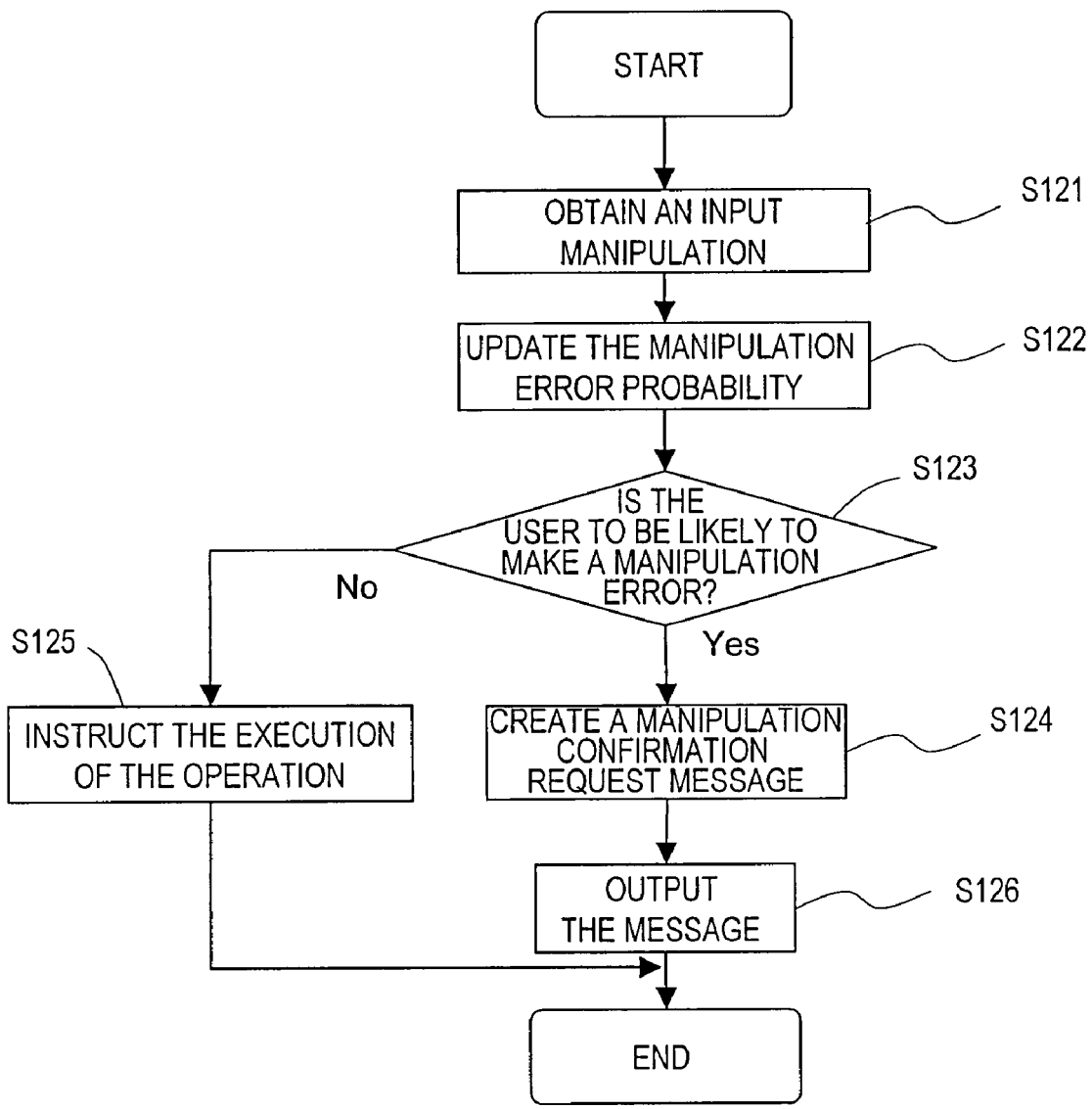
FIG. 12 is a flowchart showing a procedure of the processing executed by the information providing unit 100.

FIG. 12 shows a procedure of the processing executed by the information providing unit 100. In step S121, the input section 101 and the sorting section 102 obtain a received input manipulation from the user.

In step S122, the calculation section 105 refers to the device manipulation DB 39 in the database storage section 104 to calculate the manipulation error probability and creates a new manipulation error probability table. The calculation section 105 stores the manipulation error probability table in the probability information storage section 106.

In step S123, the determination section 107 determines whether or not the input manipulation of the user is likely to be a manipulation error. When it is determined that the input manipulation is likely to be a manipulation error, the processing advances to step S124. When it is determined that the input manipulation is not likely to be a manipulation error, the processing advances to step S125.

In step S124, the determination section 107 creates a manipulation confirmation request message to be presented to the user. In step S126, the output section 108 outputs a signal for presenting the manipulation confirmation request message created in step S124.

In step S125, the control section 103 outputs, to the recorder 1, a signal for instructing an execution of the function corresponding to the input manipulation obtained from the user.

According to the above-described processing, the information providing unit 100 can update the manipulation error probability for the manipulation input by the user, and use the updated manipulation error probability to output a manipulation confirmation request for the manipulation for which the user is likely to make an error.

Figure 13:
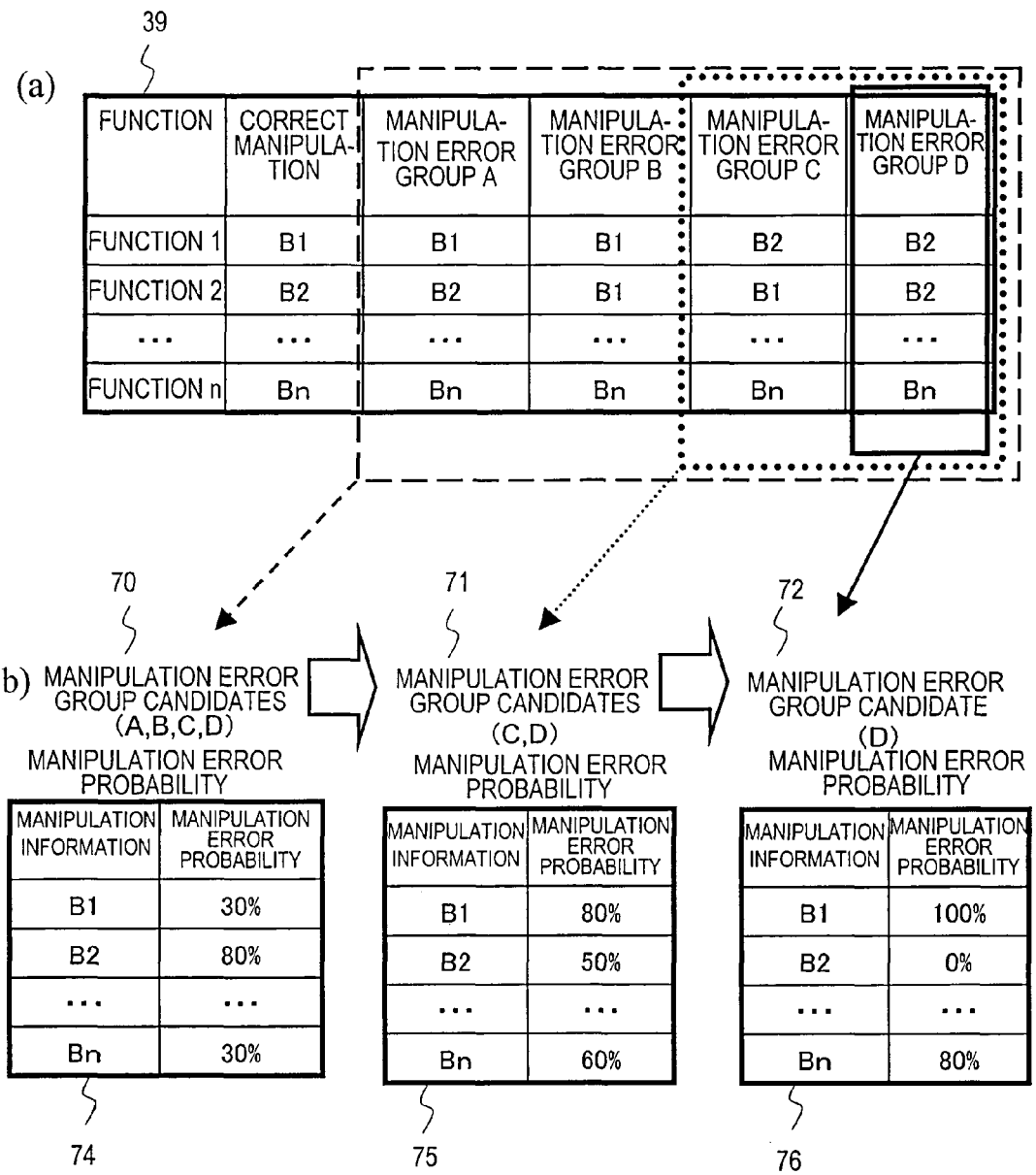
FIGS. 13(a) and (b) show an example of updating the manipulation error probability based on the history of input manipulations.

Now, with reference to FIG. 13, an example of updating the manipulation error probability will be described. FIGS. 13(a) and (b) show an example of updating the manipulation error probability based on the history of input manipulations. In the example of FIGS. 13(a) and (b), the manipulation error group candidate is changed by the manipulation history. The frames represented by a plurality of types of dashed lines in FIG. 13(a) respectively show parts of the device manipulation DB 39 to be referred to.

Specifically, while the manipulation error group candidates are sequentially narrowed down from (A, B, C, D)70 to (C, D)71, and then to (D)72, the part of the device manipulation DB 39 which is referred to is sequentially switched to the data part corresponding to the manipulation error group candidate(s). An initial manipulation error probability table 74 is changed to a manipulation error probability table 75, and then to a manipulation error probability table 76. Thus, the manipulation error probability table of the manipulation error group which is as close as possible to the group to which the user belongs is obtained.

This will be described in more detail with a specific example. Now, it is assumed that the user who is manipulating the recorder 1 has an experience of using a DVD recorder of the model corresponding to the manipulation error group D. With this condition, an operation of the information providing unit 100 for outputting a manipulation confirmation request for the manipulation information B1 will be described. As shown in FIG. 13(a), the user who belongs to the manipulation error group candidate D is considered to be likely to manipulate the button B1 for executing function 1 by mistake. Therefore, a manipulation confirmation request is necessary for the manipulation information B1. The information providing unit 100 determines that the user belongs to the manipulation error group candidate D and provides a manipulation confirmation request. This will be described hereinafter. In the following description, the threshold value for outputting the manipulation confirmation request is 70%.

The user performs various types of manipulations other than the manipulation corresponding to the manipulation information B1. Thus, based on the processing of the calculation section 105 described with reference to FIGS. 6(a) and (b), the manipulation error group candidates are narrowed down from the initial candidates (A, B, C, D)70 to the candidates (C, D)71. For example, the user performs a manipulation corresponding to manipulation information $B_K$ or cancels such a manipulation. When, as a result, only the manipulation error probability of the manipulation error group candidates (C, D)71 for the manipulation information $B_K$ exceeds 70%, the manipulation error group candidates (C, D)71 are specified.

The calculation section 105 reads the data in the device manipulation DB 39 corresponding to the specified manipulation error group candidates (C, D)71, calculates the manipulation error probability for each piece of manipulation information, and creates the manipulation error probability table 75. The manipulation error probability for the manipulation information B1 is 30% for the initial manipulation error group candidates (A, B, C, D)70, but is calculated to be 80% for the manipulation error group candidates (C, D)71 as a result of the manipulation error groups A and B being excluded from the candidates for calculating the manipulation error probability. Since the manipulation error probability exceeds 70% as the threshold value, the determination section 107 instructs a confirmation request to be output before the function corresponding to the manipulation information B1 is executed and also outputs, to the recorder 1, a signal of the confirmation request message which is to be output.

Now, as a second example, an operation of outputting a manipulation confirmation request when the user belonging to the manipulation error group candidate (D)72 presses a button B2 will be described with reference to FIG. 13. The threshold value for outputting the manipulation confirmation request is again 70%. As shown in FIG. 13(*a*), the user belonging to the manipulation error group candidate (D) correctly manipulates the button B2 for executing function 2 and cannot be considered to be likely to manipulate the button B2 by mistake. Therefore, for manipulation information B2, a manipulation confirmation request is not necessary. The information providing unit 100 determines that the user belongs to the manipulation error group candidate D and provides a manipulation confirmation request. This will be described hereinafter. The processing of specifying the manipulation error group candidates (C, D)71 and the processing of creating the manipulation error probability table 75 corresponding to the manipulation error group candidates (C, D)71 are substantially the same as above and will not be described.

The manipulation error probability for the manipulation information B2 is 80% for the initial manipulation error group candidates (A, B, C, D)70, but is calculated to be 50% for the manipulation error group candidates (C, D)71 as a result of the manipulation error groups A and B being excluded from the candidates for calculating the manipulation error probability. Since the manipulation error probability is smaller than the threshold value, the determination section 107 determines not to provide a manipulation confirmation request before the function corresponding to the manipulation information B2 is executed. As a result, the control section 103 instructs the recorder 1 to execute the function corresponding to the manipulation information B2. The manipulation confirmation request is not provided.

In this manner, the manipulation error group to which the user does not belong is specified and excluded from the target of calculation of the manipulation error probability. Thus, the manipulation error probability can be updated with higher precision, and it can be accurately estimated and determined whether or not the user is likely to make an error when performing the manipulation which he/she performs for the first time. Based on the determination result, a manipulation confirmation request necessary for the user can be output, or a manipulation confirmation request not necessary for the user is not output.

Thus, a manipulation confirmation request can be provided for the manipulation for which the user is likely to make an error, and the number of times that an unnecessary manipulation confirmation request is provided can be reduced. As a result, the load on the user can be alleviated.

Embodiment 2

In this embodiment, a structure of a manipulation confirmation information providing unit which is different from the manipulation confirmation information providing unit in Embodiment 1 will be described. In this embodiment also, the manipulation confirmation information providing unit is incorporated into a DVD recorder and operates in association with the manipulation on the DVD recorder.

When the information providing unit in Embodiment 1 is used, once the manipulation error group is specified, a manipulation confirmation request message is always output for a certain manipulation information. This is effective for a relatively initial period of manipulating the apparatus.

However, after the user performs the same manipulation a plurality of times with the manipulation confirmation request message being output repeatedly, it is considered that the user learns the manipulation. If, despite this, the information providing unit 100 determines to output the confirmation request message for the manipulation information that the user has already learned, this may possibly be an unnecessary manipulation confirmation request message for the user.

By contrast, even when the manipulation error probability for a certain manipulation is low, if the user performs the manipulation after not performing for a long time, it is highly possible that the user makes a manipulation error. If, despite this, the information providing unit 100 determines that a confirmation request message is not necessary, this means that a manipulation confirmation request message necessary for the user is not presented.

With the manipulation confirmation information providing unit according to this embodiment, after the user uses a certain apparatus for a certain time period, the manipulation error probability for the manipulation information can be newly updated in accordance with the total number of times that the manipulation confirmation request has been provided for the manipulation information. Thus, an unnecessary manipulation confirmation request can be prevented from being provided for the manipulation that the user has already learned.

Also with the manipulation confirmation information providing unit according to this embodiment, when the user has not used a certain apparatus for a certain time period, the manipulation error probability for a manipulation which was previously low is re-set to be high in accordance with such a period. For the manipulation for which a manipulation confirmation request is thus determined to be necessary, the manipulation confirmation request is allowed to be provided.

1. Description of Each Element of the Manipulation Confirmation Information Providing Unit According to Embodiment 2

Figure 14:
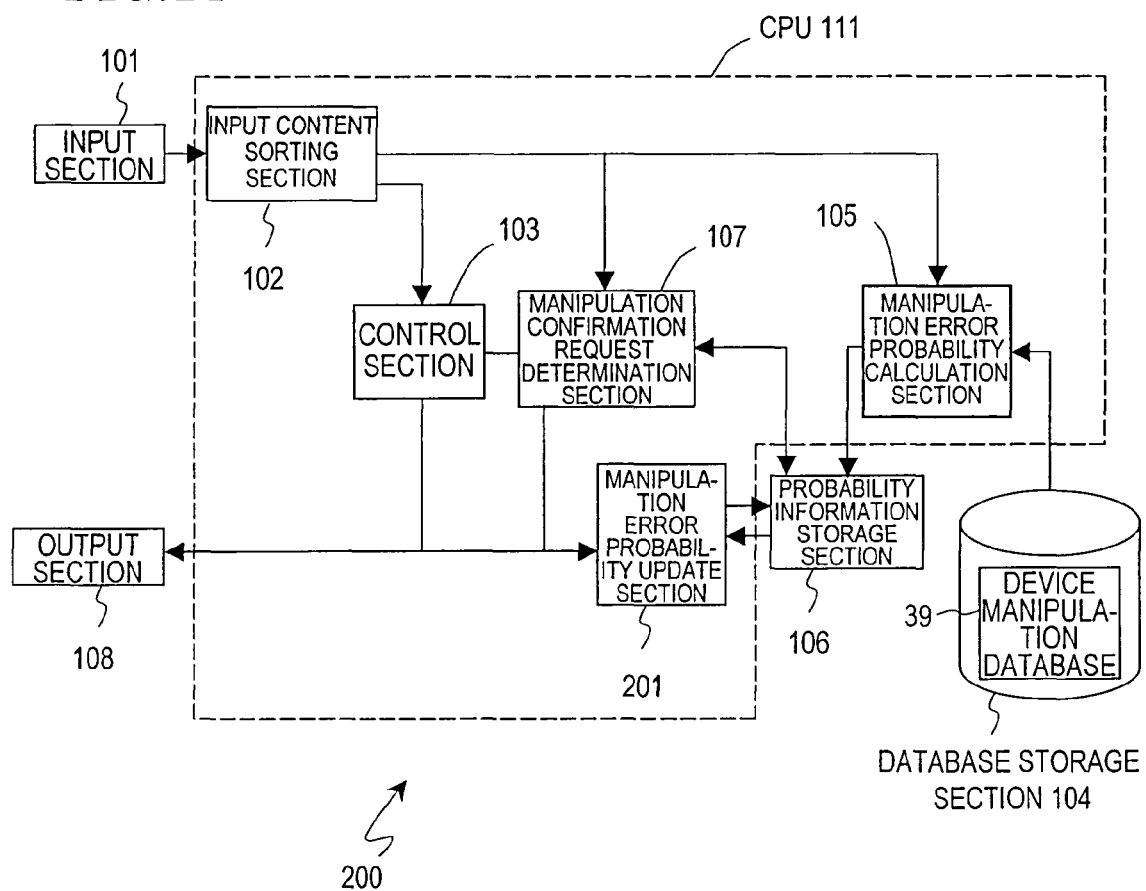
FIG. 14 shows a structure of functional blocks of an information providing unit 200 according to an embodiment of the present invention.

First, with reference to FIG. 14, a structure of the manipulation confirmation information providing unit will be described. FIG. 14 shows a structure of functional blocks of a manipulation confirmation information providing unit 200 (hereinafter, referred to as the "information providing unit 200") according to this embodiment. Among the elements shown in FIG. 14, the elements having the same functions as those in FIG. 3 bear the same reference numerals therewith and descriptions thereof will be omitted.

The information providing unit 200 is different from the information providing unit 100 according to Embodiment 1 (FIG. 3) in that the former includes a manipulation confirmation request update section 201 (hereinafter, referred to as the "update section 201"). The CPU 111 of the information providing unit 200 includes the update section 201 in addition to the elements of the CPU 110 in FIG. 3. The CPU 111 is different from the CPU 110 on presence/absence of the update section 201.

When a manipulation confirmation request is output, the update section 201 specifies the manipulation information for which the manipulation confirmation request is output, and updates the manipulation error probability for the manipulation information. An exemplary update method is as follows. When a manipulation confirmation request is output for a certain type of manipulation information, the manipulation error probability stored in the manipulation error probability storage section 106 for the manipulation information is decreased at a certain ratio in accordance with the number of times that the manipulation confirmation request has been output. More specifically, when a manipulation confirmation request on the "recording mode" button is output as shown in FIG. 9, the initial manipulation error probability of 80% for the manipulation information is updated to half, i.e., 40%. Thus, an unnecessary manipulation confirmation request is not provided for the manipulation that the user has already learned, and a manipulation confirmation request can be output only for the manipulation for which such a manipulation confirmation request is necessary.

Another exemplary update method is as follows. When a certain type of manipulation information has not been used for a certain time period, the manipulation error probability for the manipulation information may be increased at a certain ratio. For example, where the stored manipulation error probability for the "recording mode button" is 40% but the "recording mode button" has not been manipulated for one month, the manipulation error probability is increased to 60%. Thus, even for a manipulation that the user forgot by an elapse of time, a manipulation confirmation request can be output. A manipulation confirmation request can be output for the manipulation for which such a manipulation confirmation request is necessary for the user.

Still another exemplary update method is as follows. A manipulation confirmation request is provided, and when the manipulation for which the confirmation request was provided is executed, the manipulation error probability may be decreased at a certain ratio; whereas when the manipulation for which the confirmation request was provided is not executed, the manipulation error probability may be increased at a certain ratio.

For example, it is assumed that when the "recording mode" button is pressed, a predetermined manipulation confirmation request message "The quality of the image to be recorded is determined. The quality can be selected from four types: XP mode (high quality), SP mode (standard quality), LP mode (long time) and EP mode (longer time). Do you want to set the quality?" is output. When the user selects "yes" and executes the manipulation for which the confirmation request was provided, the manipulation error probability for the "recording mode" button is decreased from 70% before the confirmation request to 30%. The manipulation error probability is updated to a lower value because the user manipulates the "recording mode" button correctly.

By contrast, when the user selects "no" and does not execute the manipulation for which the confirmation request was provided, this means that the user manipulates the "recording mode" button by mistake. Therefore, the manipulation error probability for the "recording mode" button is increased from 70% before the confirmation request to 90%. In this manner, even when a manipulation confirmation request is output for the manipulation that the user already knows, the manipulation error probability can be updated such that the manipulation confirmation request is not provided the next time, and a manipulation confirmation request is provided only for the manipulation that the user does not know.

2. Description of the Manipulation Confirmation Information Providing Unit According to Embodiment 2

Now, with reference to FIG. 15, a procedure of the overall processing executed by the information providing unit 200 will be described. FIG. 15 is a flowchart showing a procedure of the processing executed by the information providing unit 200. In FIG. 15, identical steps as those in FIG. 12 bear the same reference numerals therewith and descriptions thereof will be omitted.

The procedure shown in FIG. 15 is different from the procedure of the processing according to Embodiment 1 (FIG. 12) in that the former includes step S151 of updating the manipulation error probability using the result of outputting the manipulation confirmation request.

Specifically, in step S151, the update section 201 updates, i.e., increases or decreases, the manipulation error probability for a specified type of manipulation information in the manipulation error probability table stored in the probability information storage section 106.

By additionally performing step S151, the manipulation error probability is updated based on the manipulation input by the user and the result of outputting the manipulation confirmation request. Using the updated manipulation error probability, an unnecessary manipulation confirmation request is prevented from being provided and a manipulation confirmation request is allowed to be provided only for the manipulation for which such a manipulation confirmation request is necessary.

As described above, the manipulation confirmation information providing device according to this embodiment can update the manipulation error probability more accurately in accordance with the total number of times that the manipulation confirmation request has been provided, the time period in which the manipulation has not been performed, or the like.

FIG. 16 shows an example of updating the manipulation error probability based on an output of a manipulation confirmation request. As shown in FIG. 16, the information providing unit 200 outputs a first manipulation confirmation request 80 for the manipulation information B2 and then, based on a subsequent manipulation, a second manipulation confirmation request 81 for the manipulation information B2. As a result, a manipulation error probability 82 for the manipulation information B2 is updated from 90% to 70% to 50%.

Thus, after the user uses the apparatus for a while and the manipulation confirmation request is output a plurality of times, an unnecessary manipulation confirmation request is prevented from being provided for the manipulation that the user has already learned, and a manipulation confirmation request is allowed to be output only for the manipulation for which such a manipulation confirmation request is necessary.

Industrial Applicability

A manipulation confirmation information providing device according to the present invention has a plurality of pieces of information, on manipulation errors for each of functions of a manipulation target apparatus (manipulation error pattern), which are defined based on a manipulation experience of a plurality of users having the manipulation experience with an apparatus other than the manipulation target apparatus. It is determined to which manipulation error pattern each user corresponds based on the manipulation history of the user, and thus the manipulation error group can be estimated only from the manipulation history of the user. The manipulation error probability is updated with high precision by estimating the manipulation error group, and thus a manipulation confirmation request can be provided for the manipulation for which the user is likely to make an error. This is effective for providing a manipulation comprehension support to the user, and for preventing the user from making a manipulation error, regarding an apparatus such as a DVD recorder/player, a mobile phone or the like which is to be manipulated in a different manner for each of a plurality of functions or by each of a plurality of manufacturers. This is also effective for providing a comprehension support to the user, and for preventing the user from making a manipulation error, regarding software such as document creation software or service which is to be manipulated in a different manner for each of a plurality of functions or by each of a plurality of manufacturers.

The invention claimed is:

1. An electronic apparatus, comprising:
a storage section which stores a database including a plurality of manipulation error patterns, each of the manipulation error patterns being information on a manipulation error on each of functions of a manipulation target apparatus, the information being defined based on a manipulation experience of a plurality of users each having the manipulation experience with an apparatus other than the manipulation target apparatus;
an input section for receiving a manipulation of a user;
a determination section for determining whether or not to provide a confirmation request for the manipulation based on at least one of the manipulation error patterns corresponding to the user, which is determined by referring to the database based on manipulation information and correction information, the manipulation information indicating the received manipulation and the correction information indicating whether or not to correct the manipulation; and
an output section for outputting a signal for presenting a manipulation confirmation request message when it is determined to provide the confirmation request for the manipulation.

2. The electronic apparatus according to claim 1, further comprising a calculation section for determining the at least one of the manipulation error patterns corresponding to the user by referring to the database based on the manipulation information and the correction information, and calculating a manipulation error probability of the determined at least one manipulation error pattern for each piece of manipulation information,
wherein the determination section determines whether or not to provide the confirmation request for the manipulation based on the manipulation error probability for the manipulation information.

3. A device for providing manipulation confirmation information, the device being usable for an electronic apparatus including an input section for receiving a manipulation of a user, the electronic apparatus operating in accordance with the manipulation, the device comprising:

a storage section which stores a database including a plurality of manipulation error patterns, each of the manipulation error patterns being information on a manipulation error on each of functions of a manipulation target apparatus, the information being defined based on a manipulation experience of a plurality of users each having the manipulation experience with an apparatus other than the manipulation target apparatus;
a determination section for determining whether or not to provide a confirmation request for the manipulation based on at least one of the manipulation error patterns corresponding to the user, which is determined by referring to the database based on manipulation information and correction information, the manipulation information indicating the received manipulation and the correction information indicating whether or not to correct the manipulation; and
an output section for outputting a signal for presenting a manipulation confirmation request message when it is determined to provide the confirmation request for the manipulation.

4. The device according to claim 3, further comprising a calculation section for determining the at least one manipulation error pattern corresponding to the user by referring to the database based on the manipulation information and the correction information, and calculating a manipulation error probability of the determined at least one manipulation error pattern for each piece of manipulation information,
wherein the determination section determines whether or not to provide the confirmation request for the manipulation based on the manipulation error probability for the manipulation information.

5. The device according to claim 4, wherein when it is determined not to provide the confirmation request for the manipulation, the output section outputs an instruction signal for causing an execution of an operation based on the received manipulation.

6. The device according to claim 4, further comprising a probability information storage section for retaining information on the probability.

7. The device according to claim 4, wherein the determination section determines whether or not to provide the confirmation request for the manipulation based on a comparison result between the manipulation error probability for the manipulation information and a predetermined threshold value.

8. The device according to claim 4, further comprising a sorting section for sorting and outputting the manipulation information and the correction information based on the received manipulation, the sorting section outputting the manipulation information based on the received manipulation and outputting the correction information based on at least one of a time period elapsing after the manipulation is received and a manipulation received after the manipulation information is generated.

9. The device according to claim 8, wherein in the case where a signal including the manipulation confirmation request message is output, when a finalization manipulation is performed for finalizing the manipulation for which the confirmation request was provided, the sorting section outputs the manipulation information which indicates the manipulation for which the confirmation request was provided and the correction information which indicates that the manipulation is not corrected.

10. The device according to claim 8, wherein in the case where a signal including the manipulation confirmation request message is output, when a cancellation manipulation is performed for canceling the manipulation for which the confirmation request was provided, the sorting section outputs the manipulation information which indicates the manipulation for which the confirmation request was provided and the correction information which indicates that the manipulation is corrected.

11. The device according to claim 8, wherein when a cancellation manipulation is performed for canceling the received manipulation, the sorting section outputs the manipulation information which indicates the manipulation and the correction information which indicates that the manipulation is corrected.

12. The device according to claim 8, wherein when any further manipulation is not received for a predetermined time period after the manipulation is received, the sorting section outputs the manipulation information which indicates the manipulation and the correction information which indicates that the manipulation is corrected.

13. The device according to claim 4, wherein in the database stored in the storage section, each of the manipulation error patterns is defined based on a manipulation experience of a plurality of users who have manipulated one of a plurality of manipulation target apparatuses which have different manipulation systems.

14. The device according to claim 13, wherein each of the manipulation target apparatuses has at least a predetermined number of functions which are common with the apparatus with which the plurality of users each already have the manipulation experience.

15. The device according to claim 14, wherein regarding at least one of the common functions, the number of manipulation steps necessary for executing the function in each of the manipulation target apparatuses is different from the number of manipulation steps necessary for executing the function in the apparatus with which the plurality of users each already have the manipulation experience.

16. The device according to claim 13, wherein each of the manipulation target apparatuses has at least a predetermined number of button labels which are different from those of the apparatus with which the plurality of users each already have the manipulation experience.

17. The device according to claim 13, wherein in the database stored in the storage section, each of the manipulation error patterns is information on a manipulation error on at least one of the functions which is common with the apparatus with which the plurality of users each already have the manipulation experience.

18. The device according to claim 4, further comprising an update section for updating the probability,
wherein when the determination section determines to provide the confirmation request for the manipulation, the update section updates the probability for the manipulation information on the manipulation in accordance with a total number of times that the confirmation request for the manipulation has been provided.

19. The device according to claim 18, wherein when the confirmation for the manipulation is provided a plurality of times, the update section decreases the probability for the manipulation information on the manipulation at a certain ratio.

20. The device according to claim 4, further comprising an update section for updating the probability,
wherein the update section increases the probability for the manipulation information on the manipulation in accordance with a time period in which the manipulation has not been performed.

21. The device according to claim 20, wherein when the manipulation is not performed for at least a predetermined time period, the update section increases the probability for the manipulation information on the manipulation at a certain ratio.

* * * * *